(12) United States Patent
Takagi

(10) Patent No.: US 6,969,439 B1
(45) Date of Patent: Nov. 29, 2005

(54) METHOD AND DEVICE FOR MANUFACTURING BELT MATERIAL FOR TIRE

(75) Inventor: Shigemasa Takagi, Gifu (JP)

(73) Assignee: Fuji Seiko Co., Ltd., Gifu (JP)

( * ) Notice: Subject to any disclaimer, the term of this patent is extended or adjusted under 35 U.S.C. 154(b) by 291 days.

(21) Appl. No.: 10/070,493

(22) PCT Filed: Sep. 7, 2000

(86) PCT No.: PCT/JP00/06097

§ 371 (c)(1),
(2), (4) Date: Mar. 7, 2002

(87) PCT Pub. No.: WO01/17759

PCT Pub. Date: Mar. 15, 2001

(30) Foreign Application Priority Data

| Sep. 7, 1999 | (JP) | ................................. 11-253081 |
| Jul. 6, 2000 | (JP) | ................................. 2000-205150 |
| Aug. 17, 2000 | (JP) | ................................. 2000-247851 |
| Sep. 6, 2000 | (JP) | ................................. 2000-270828 |

(51) Int. Cl.$^7$ ............................................ B29D 30/38
(52) U.S. Cl. ................... 156/117; 156/174; 156/193; 156/397; 156/427
(58) Field of Search ............ 156/117, 174, 133, 156/193, 255, 397, 408, 426, 427, 148; 57/2.3, 57/295, 1 UN, 297

(56) References Cited

U.S. PATENT DOCUMENTS

| 885,219 | A | * | 4/1908 | Bayne et al. ................ 138/130 |
| 1,337,690 | A | * | 4/1920 | Converse et al. ............ 156/174 |
| 3,608,606 | A | | 9/1971 | Marzocchi et al. |
| 3,682,222 | A | | 8/1972 | Alderfer |
| 3,751,316 | A | | 8/1973 | Menough et al. |
| 4,473,427 | A | | 9/1984 | Irie |
| 4,812,196 | A | * | 3/1989 | Ishii ............................ 156/412 |
| 5,114,511 | A | * | 5/1992 | Goodfellow ................. 156/133 |
| 5,192,390 | A | * | 3/1993 | Perkins ........................ 156/425 |

FOREIGN PATENT DOCUMENTS

| EP | 537780 | 4/1993 |
| EP | 0 724 951 A2 | 8/1996 |
| EP | 0 740 999 A2 | 11/1996 |
| EP | 0 724 951 A3 | 3/1997 |

(Continued)

OTHER PUBLICATIONS

European Application No. No. 00957016, Search Report dated Apr. 20, 2004.

*Primary Examiner*—Geoffrey L. Knable
(74) *Attorney, Agent, or Firm*—Caesar, Rivise, Bernstein, Cohen & Pokotilow, Ltd.

(57) ABSTRACT

A method of manufacturing a belt material for tire, comprising the steps of spirally winding a ribbon, having a plurality of linear cords disposed longitudinally and coated with rubber, on the outer peripheral surface of a drum at specified pitches while the drum is rotated, sticking the side edges of the wound ribbon to each other so as to form a cylindrical wound body, and a linearly moving rotating blade in the axial direction of the drum in contact with a spiral blade groove formed in the drum at specified pitches while the drum is rotated so as to cut the wound body spirally so as to form a belt material having a specified width and a cord inclination angle.

23 Claims, 32 Drawing Sheets

FOREIGN PATENT DOCUMENTS

| | | | |
|---|---|---|---|
| EP | 927629 | 7/1999 | |
| EP | 1 172 476 A1 | 1/2002 | |
| EP | 1 226 925 A1 | 7/2002 | |
| EP | 1 312 462 A1 | 5/2003 | |
| GB | 960488 * | 6/1964 | |
| JP | 28-3485 | 7/1953 | |
| JP | 59022721 A * | 2/1984 | ................ 156/193 |
| JP | 60/204324 | 10/1985 | |
| JP | 5-309761 | 11/1993 | |
| JP | 10-217353 | 8/1998 | |
| JP | 10-217354 | 8/1998 | |
| JP | 11-240080 | 7/1999 | |
| JP | 11-240080 | 9/1999 | |
| JP | 2000-202925 | 7/2000 | |
| WO | WO 89/04246 | 5/1989 | |

* cited by examiner

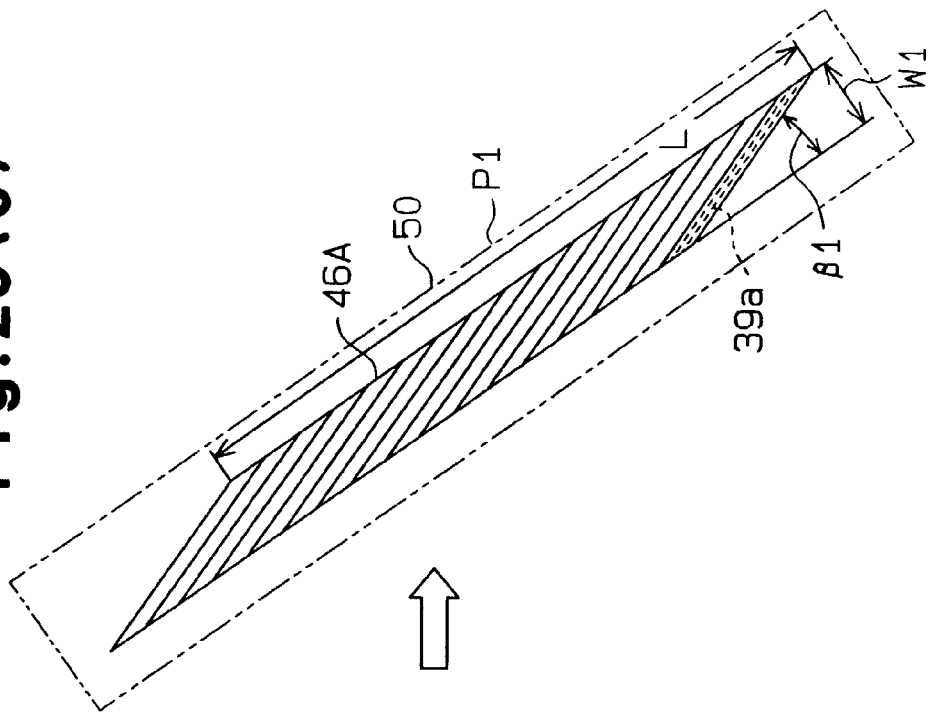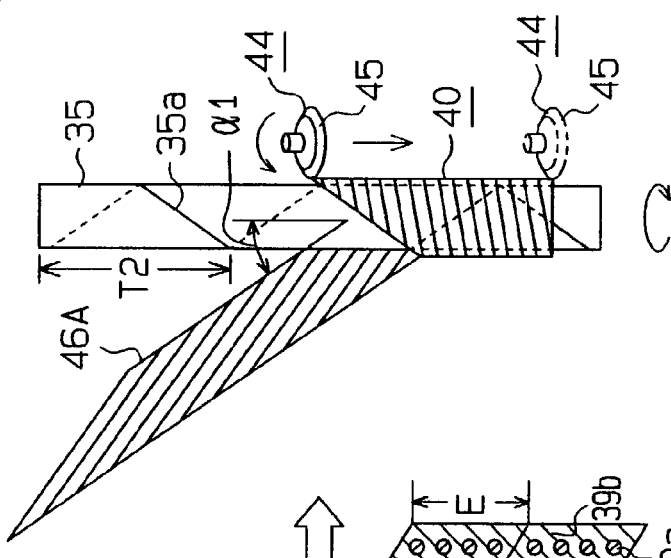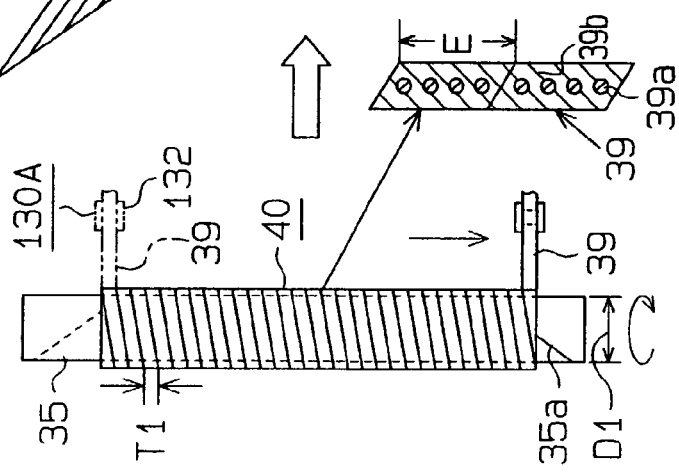

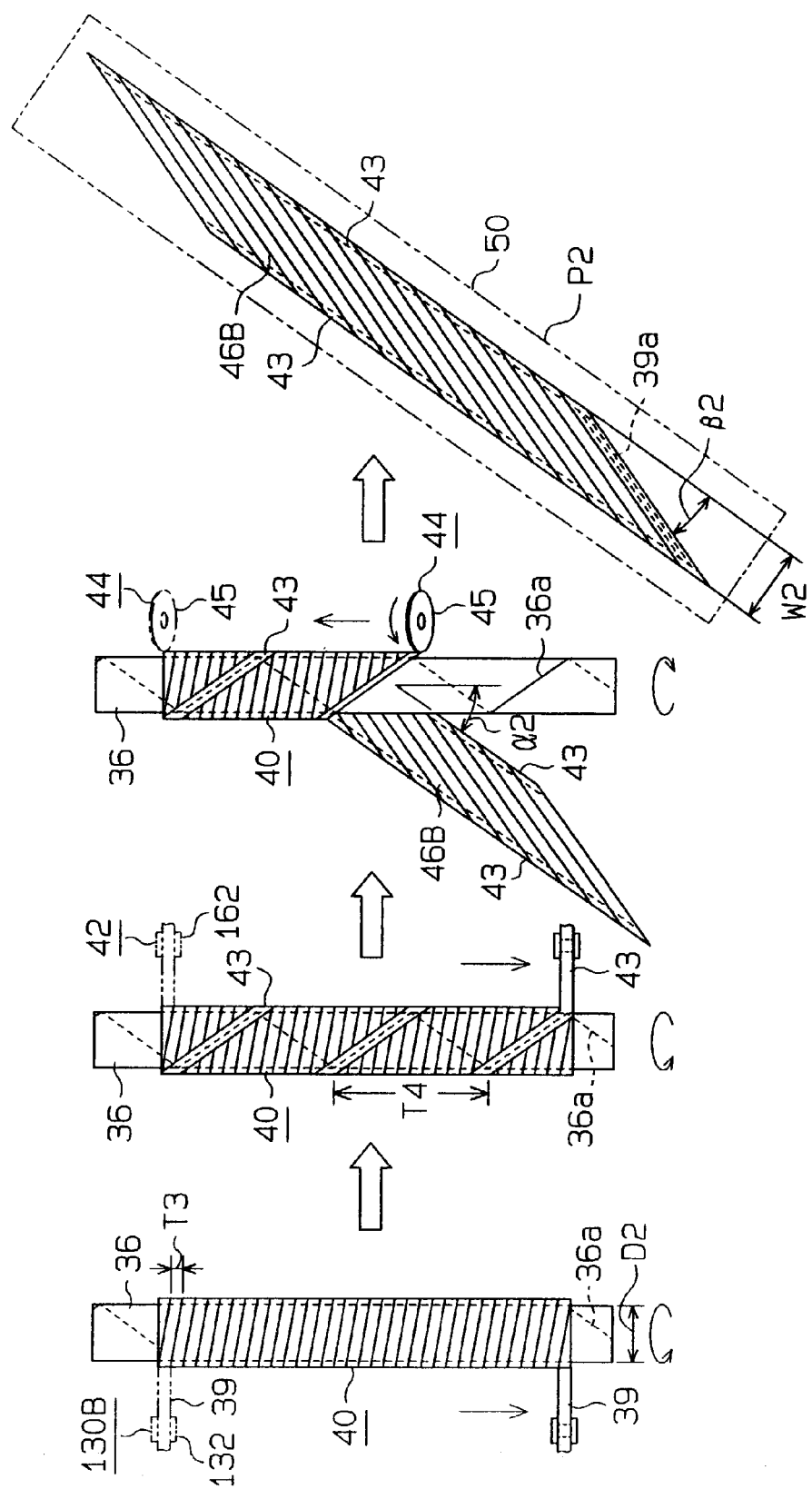

METHOD AND DEVICE FOR MANUFACTURING BELT MATERIAL FOR TIRE

BACKGROUND OF THE INVENTION

This invention relates to a method and a device for manufacturing a belt material for a tire, which is embedded and used, for example, in a pneumatic radial tire.

A pneumatic tire is provided with belts on the radially outer side of a carcass layer to wrap around the carcass layer for improving the cut resistance. While these belts have been manufactured by a large machine provided with a calender, a bias cutter and the like, such a large machine is not suitable for manufacturing numerous types of belts different in specifications these days when the policy of manufacturing many kinds in small volumes is prevailing in the manufacturing industry.

To address the problem as mentioned, a method of manufacturing a flat ribbon-shaped object has conventionally been proposed, for example, as disclosed in Japanese Patent Publication No. Sho 28-3485. This conventional manufacturing method involves winding back yarns from a large number of bobbins mounted on a krill, lining up a group of yarns, spirally winding the group of yarns on a rotary drum formed with spiral parallel grooves on the outer periphery, coating a raw rubber liquid on the wound yarns or rubbing a hard pasty rubber into the wound yarns, heating and vulcanizing the resulting product, and cutting it along the spiral parallel grooves to form the flat ribbon-shaped object.

In the current situation where steel radial tires are mainly used, belts are also made of steel cords. Also, in the belts, linear cords are arranged as obliquely extending at a predetermined angle to the center line of the belt width. In this event, since a tire is a high speed rotating body which receives a dynamic load, the linear cords need be positioned to maintain a lateral balance with respect to the center line of the belt width. For this reason, the belts in the tire are generally comprised of belt materials disposed on the radially outer side, and belt materials disposed on the radially inner side, and these belt materials are arranged such that their linear cords are laterally symmetrically arranged. As to the widths of the belt materials, the belt material on the radially outer side is made narrower than the belt material on the radially inner side.

However, in the conventional manufacturing method, after a group of yarns have been wound around a rotary drum, a raw rubber liquid is coated on or a hard pasty rubber is rubbed into the wound yarns which are then heated and vulcanized. Thus, a wide space is required for installing a krill mounted with a large number of bobbins, thereby giving rise to a problem that the installation space cannot be reduced.

Also, since the linear cords are arranged in a single direction, the conventional manufacturing method has a problem that difficulties are found in applying this method to the manufacturing of a belt of a two-layer structure comprising steel cords as mentioned above.

Further, in the conventional manufacturing method, after a group of yarns has been wound around the outer periphery of a single rotary drum, the group of yarns is cut along the spiral parallel grooves on the rotary drum. This also causes a problem in the inability of a single machine to manufacture two types of belt materials which are different in the direction in which linear cords are arranged on the radially outer side and radially inner side, and in width.

Conventionally, tires have been produced through mass production pointing. For example, wide and elongated sheets are sequentially created, the sheets are cut into a large number of pieces having required dimensions, and the cut sheets are bound to each other in the shape of band which is rolled up for temporary storage as belt materials. The belt materials in stock are sent to a next process. In other words, large sized sheets are fabricated and cut into pieces which are used as belt materials for manufacturing tires.

Apparently, the foregoing mass production system seems to be capable of efficiently manufacturing tires. However, since the mass production system involves manufacturing large sized sheets, and cutting the sheets into belt materials, not only large scaled manufacturing apparatus and cutting apparatus are required for the sheets, but also a space for storing sheets are also required. For this reason, a vast space is required for the factory, and immense energy is also required for operating the factory. Therefore, even if the mass production is oriented, the production cost is increased as a result, thereby failing to benefit from the merit of the mass production. Particularly, when a tire part manufacturing factory is separated from a tire forming factory due to restrictions on geographical conditions, a cost for storing and transporting tire parts accounts for a large proportion of a total cost, so that a reduction in the cost is extremely difficult. Further, since the storage of tire parts, and a transport process intervene between working processes, a variety of problems are involved in quality control regarding the humidity, curing of sheet surfaces, attachment of dusts, and so on, thereby giving rise to a problem of a reduced yield of tire products.

OBJECTS OF THE INVENTION

It is a principal object of the present invention to provide a method and a device for manufacturing a belt material for a tire which are capable of significantly reducing a space for installing a tire belt material manufacturing apparatus or capable of eliminating a space for storing intermediate bodies of belt materials to reduce a manufacturing cost.

It is another object of the present invention to provide a device for manufacturing a belt material for a tire which is capable of cutting even a belt material made of steel cords to form the belt material with a predetermined width and a predetermined cord inclination angle with a clear cut surface.

It is another object of the present invention to provide a device for manufacturing a belt material for a tire, which is capable of smoothly peeling a cut belt material from the outer periphery of a drum.

It is another object of the present invention to provide a device for manufacturing a belt material for a tire, which is capable of extensively supporting a belt material peeled from a drum to transfer it to a predetermined position on a tray without performing works such as a modification.

It is another object of the present invention to provide a device for manufacturing belt materials for a tire, which is capable of simultaneously and consecutively manufacturing two types of belt materials, which have linear cords arranged in different directions and different widths, with a single device.

It is another object of the present invention to provide a device for manufacturing a belt material for a tire, which is capable of transporting a belt material to a tire forming machine in the next process without changing the posture of the belt material.

To achieve the above objects, a method of manufacturing a belt material for a tire according to the present invention comprises the steps of spirally winding a ribbon formed of a plurality of cords arranged longitudinally and covered with a rubber coating around an outer peripheral surface of a drum having a predetermined outer diameter at a predetermined pitch, and sticking side edges of the wound ribbon to each other to form a cylindrical wound body, and spirally cutting the wound body at a predetermined pitch larger than the winding pitch of the ribbon to form a belt material having a predetermined width and a cord inclination angle.

The outer diameter of the drum, the width, winding pitch, number of windings of the ribbon, and the spiral cutting pitch of the wound body may be set based on the length, width and cord inclination angle of the intended belt material.

The length of the belt material may be set to a dimension used for a single tire.

The present invention also provides a device for manufacturing a belt material for a tire. The manufacturing device comprises a ribbon winding mechanism for spirally winding a ribbon formed of a plurality of cords arranged longitudinally and coated with a rubber around an outer peripheral surface of a drum at a predetermined pitch, a sticking mechanism for sticking side edges of the wound ribbon to each other to form a wound body, and a wound body cutting mechanism for spirally cutting the wound body at a predetermined pitch larger than the winding pitch of the ribbon to form a belt material having a predetermined width and a cord inclination angle.

SUMMARY OF THE INVENTION

The ribbon winding mechanism may comprise a ribbon winding guide corresponding to the drum rotatably supported by a frame, and a relative movement mechanism for relatively moving the drum and the ribbon winding guide in an axial direction of the drum at a predetermined feed speed.

The sticking mechanism may be configured to stick the side edges of the ribbon with a pressure by a presser roller which follows a ribbon winding operation by the ribbon winding mechanism.

The drum may be provided with a winding start end grabbing mechanism capable of grabbing a winding start end of the ribbon.

The frame or ribbon winding mechanism may be provided with a ribbon cutting mechanism for cutting a finish end of the ribbon wound around the drum.

The wound body cutting mechanism may be comprised of the drum rotatably supported by the frame, a cutter disposed corresponding to the drum for movements into contact with and away from the drum, and for cutting the wound body, and the relative movement mechanism for rotating the drum and for relatively moving the cutter in a longitudinal direction of the drum at a predetermined feed speed.

The drum may be provided with a spiral blade groove in the outer peripheral surface at the same pitch as the predetermined pitch for spirally cutting the wound body, so that a blade edge of the cutter is guided along one edge of the blade groove to cut the wound body.

A winding start end of the ribbon may be cut in a cut edge having the same angle as the spiral lead angle of the blade groove, wherein the ribbon is started to be wound with the cut edge fed along the blade groove of the drum, and the winding of the ribbon is finished with a winding finish end of the ribbon in the state matching the blade groove.

The winding finish end of the ribbon may be cut such that the angle of its cut edge is at the same angle as the spiral lead angle of the blade groove, and the cut subsequent ribbon is started to be wound such that a cut edge at a distal end of the cut subsequent ribbon is fed along the blade groove in the next winding starting operation.

The frame may be provided with a belt material peeling mechanism for pealing the belt material from the drum.

The frame may be provided with a transfer mechanism for pressing the belt material peeled from the drum onto a top surface of a tray with a predetermined pressure, and the tray may be transported in a direction intersecting the axial line of the drum by a tray transportation mechanism.

The tray may be formed in the shape of rectangle, the tray may be disposed so as to match the spiral lead angle of the spiral blade groove formed in the drum, and the tray may be moved in the transporting direction in synchronism with an operation for peeling off the belt material from the rotating drum to transfer the belt material onto the tray.

The frame may be provided with an edge tape winding mechanism for winding an edge tape on the outer peripheral surface of the wound body formed on the drum, along a scheduled spiral cutting line by the wound body cutting mechanism so as to straddle the scheduled line.

Of two processes for manufacturing the wider belt material and a narrower belt material, the edge tape winding mechanism may be configured to wind the edge tape along a scheduled spiral cutting line for a wound body for forming a wider belt material.

The ribbon winding mechanism may be configured to be capable of spirally winding the ribbon around the drums in opposite directions, and the wound body cutting mechanism may be configured to be capable of spirally cutting the wound bodies in opposite directions.

The drums may be disposed at a plurality of locations, and each of the drums may be configured to be switchable among a ribbon winding position, a ribbon sticking position, a wound body cutting position, and a belt material peeling/extracting position by a position switching mechanism.

The drums may be disposed at two locations, and cord inclination angles of the linear cords of the belt materials are substantially symmetric by winding the ribbon around the two drums in opposite directions and spirally cutting wound bodies in opposite directions.

The manufacturing device may further comprise a drum reversing/supporting mechanism for rotatably supporting a pair of drums having different outer diameters, and formed with spiral blade grooves extending in directions opposite to each other in the outer peripheral surfaces, and functioning as a position switching mechanism for alternately placing the drums at two positions, wherein a ribbon may be wound around the outer periphery of a drum arranged at one position by the drum reversing/supporting mechanism to form a wound body, and the wound body on the outer periphery of the drum arranged at the other position by the drum reversing/supporting mechanism may be cut along the blade groove of the drum to form a belt material.

The wound body cutting mechanism may be provided with a cutter for engagement with the blade groove of the drum to press a blade edge to an edge of the blade groove.

A moving table may be disposed in the tray transportation mechanism for movement corresponding to the drum in a direction intersecting the axial line thereof, a turntable is pivotally supported on the moving table, and the tray is carried on the turntable.

The turntable may be configured to be pivoted to a first inclined position inclined by a predetermined angle to one side with respect to a direction in which the moving table is moved, a second inclined position inclined by a predetermined angle to the other side with respect to the moving direction, and a transporting direction position extending along the moving direction.

Clamp means may be provided on the turntable for removably clamping the tray.

The ribbon may be formed by transferring a cord made of a plurality of twisted filaments through a twist-back member in the longitudinal direction to twist back the respective filaments and form predetermined spacings between the filaments, passing the cord in this state through a rubber liquid bath to form a rubber layer over the outer periphery of each filament, and after the respective filaments return to the original twisted state by their own twisting stresses, passing a plurality of similarly fabricated cords arranged in parallel through a rubber extruder to flatly coat a rubber coating on the rubber layer of each cord.

BRIEF DESCRIPTION OF THE DRAWINGS

FIGS. 26(a) to 26(c) are explanatory diagrams showing a process of manufacturing a belt material using one drum;

FIGS. 27(a) to 27(d) are explanatory diagrams showing a process of manufacturing a belt material using another drum;

DETAILED DESCRIPTION OF THE PREFERRED EMBODIMENT

In the following, an embodiment which embodies this invention in a belt material for a pneumatic radial tire will be described with reference to FIGS. 1 to 29.

(General Configuration of Whole Device)

Figure 1:
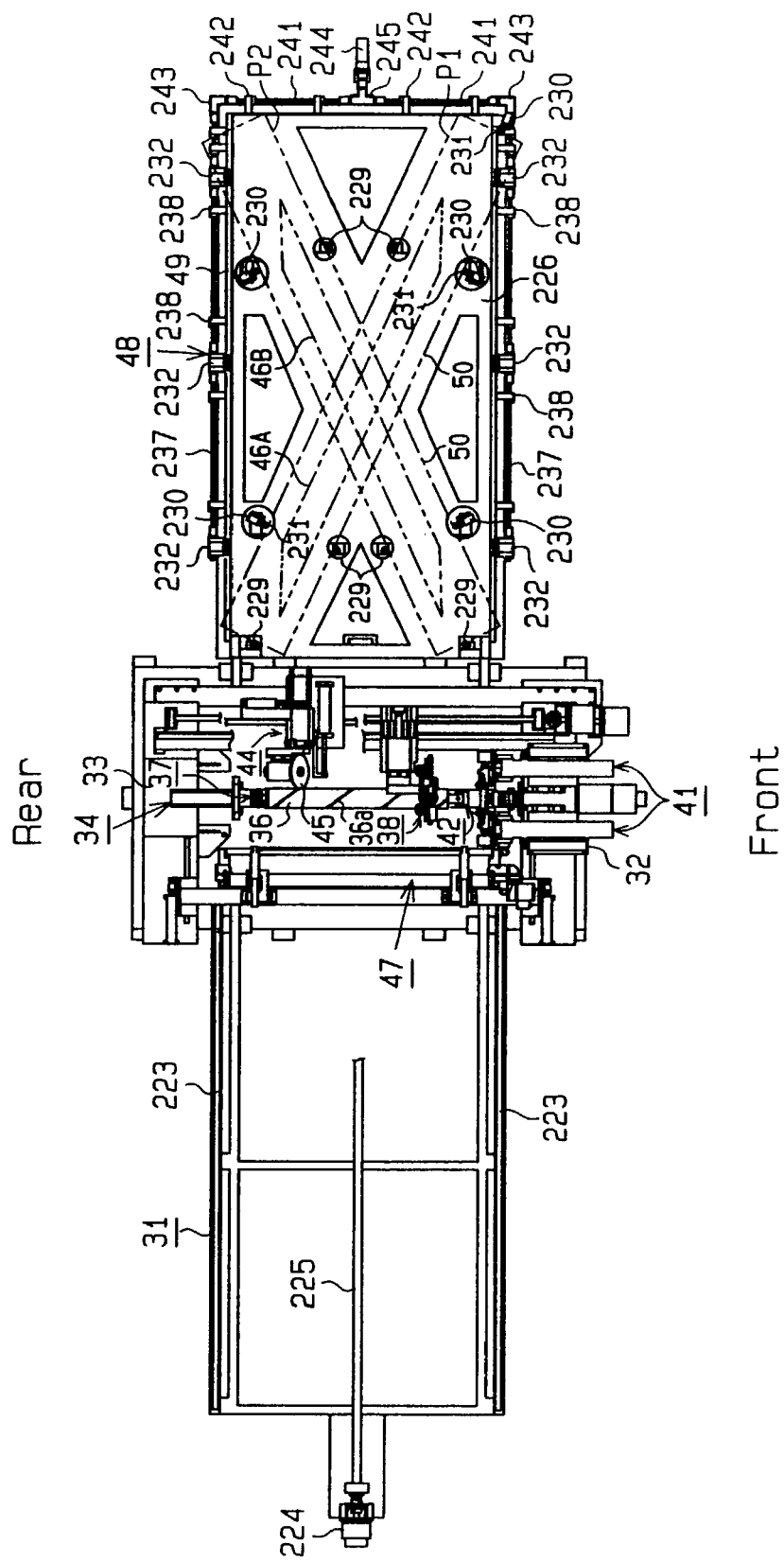
FIG. 1 is a plan view illustrating one embodiment of a device for manufacturing a belt material for a tire.
Figure 2:
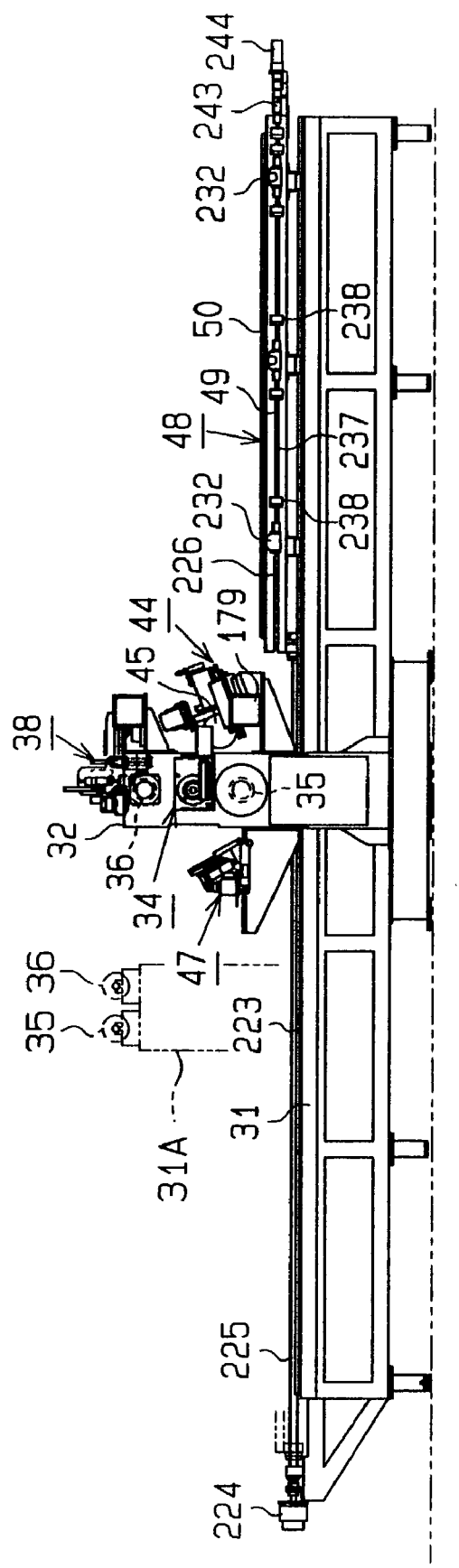
FIG. 2 is a front view of the manufacturing device of FIG. 1.
Figure 3:
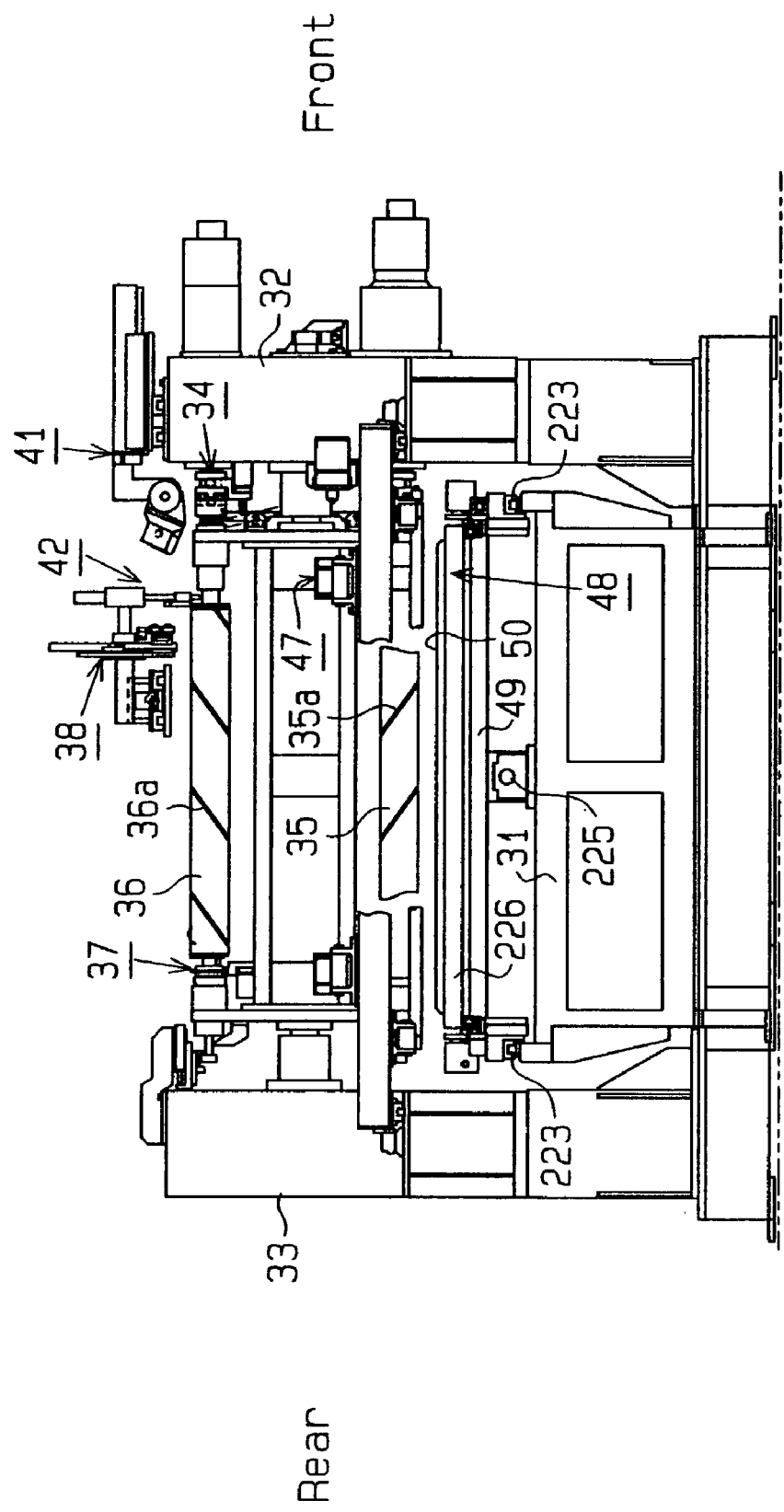
FIG. 3 is an enlarged right side view illustrating the manufacturing device of FIG. 1.

First, the overall configuration of a device for manufacturing a belt material according to this embodiment will be described in general. As illustrated in FIGS. 1 to 3, a base 31 is installed on a floor to extend in a right-to-left direction. A pair of frames 32, 33 are implanted in a front portion and a rear portion in a central region of the base 31. On the inner side surfaces of the respective frames 32, 33, drum reversing/supporting mechanisms 34 are disposed as drum position switching mechanisms such that they oppose each other. A pair of drums 35, 36 having different outer diameters are rotatably and removably supported by the drum reversing/supporting mechanisms 34 through a drum clamp mechanism 37. Also, the respective drums 35, 36 are formed with spiral blade grooves 35a, 36a, on the outer peripheral surfaces, which extend in directions opposite to each other. Then, both drums 35, 36 are reversed and arranged alternately at two positions, i.e., an upper position and a lower position, by the drum reversing/supporting mechanisms 34.

Figure 8:
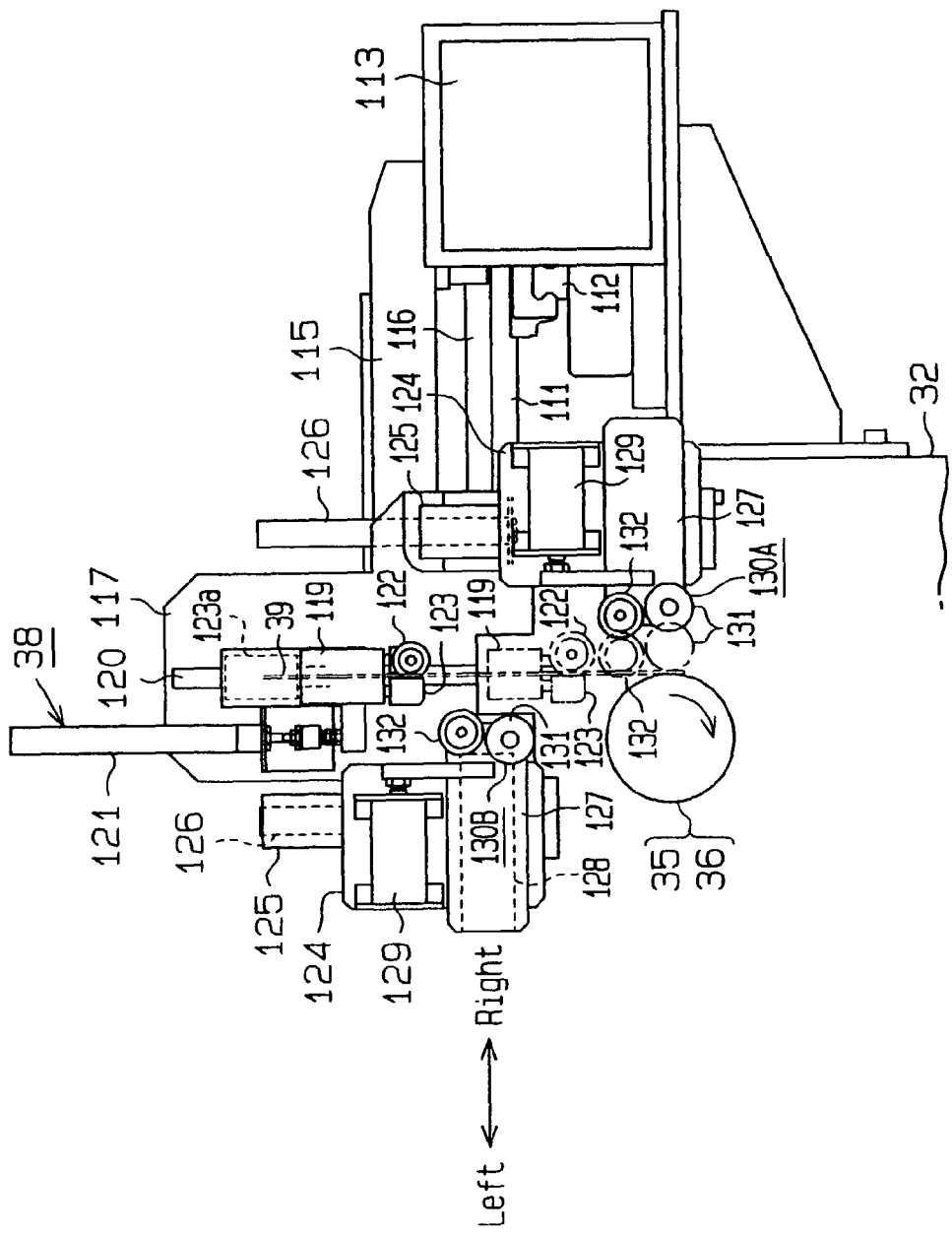
FIG. 8 is an enlarged front view illustrating a main portion of the ribbon winding mechanism of FIG. 7.
Figure 9:
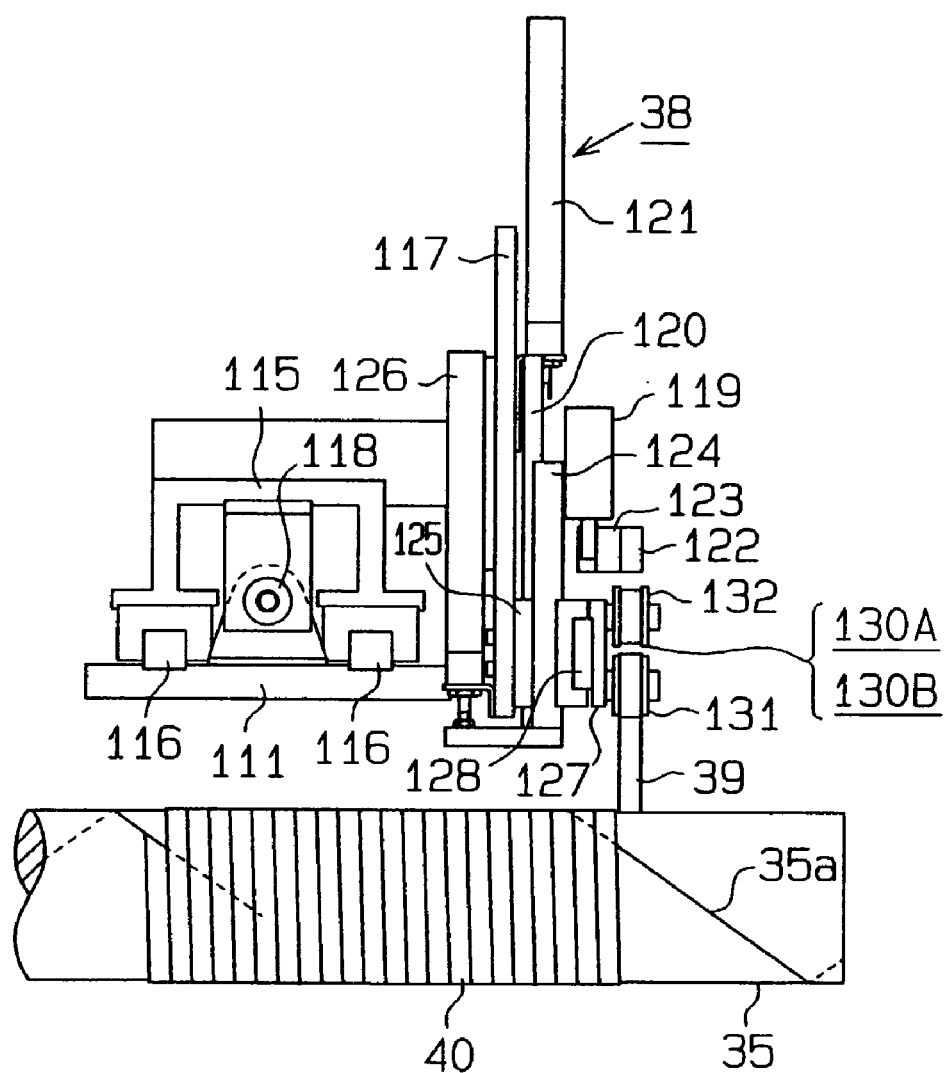
FIG. 9 is an enlarged side view illustrating a main portion of the ribbon winding mechanism of FIG. 7.

A ribbon winding mechanism 38 is disposed between both frames 32, 33 for movements in a front-to-rear direction so as to correspond to an upper right direction of the drums 35, 36 supported at the upper position by the drum reversing/supporting mechanisms 34. Then, as illustrated in FIGS. 8 and 9, a ribbon 39 is spirally wound by the ribbon winding mechanism 38 in the same directions as the blade grooves 35a, 36a on the outer peripheries of the drums 35, 36 arranged at the upper position to form a wound body 40. As illustrated in FIG. 26(a), the ribbon 39 is comprised of a plurality of linear cords 39a made of steel cords, arranged in parallel, and unvulganized rubber coating 39b formed over the outer periphery of the cords. The width E of the ribbon 39 is set, for example, to 5 to 15 mm, so that its cross-sectional shape appears to be a parallelogram.

As illustrated in FIG. 3, a ribbon cutting mechanism 41 is disposed on an inner side surface of the front frame 32 so as to correspond to a movement end position of the ribbon winding mechanism 38. Then, the ribbon winding mechanism 38 is moved to the front movement end position along the drums 35, 36 at upper position, and when the ribbon 39 has been wound around the outer peripheries of the drums 35, 36, the end of the wounded ribbon 39 is cut by the ribbon cutting mechanism 41.

Figure 14:
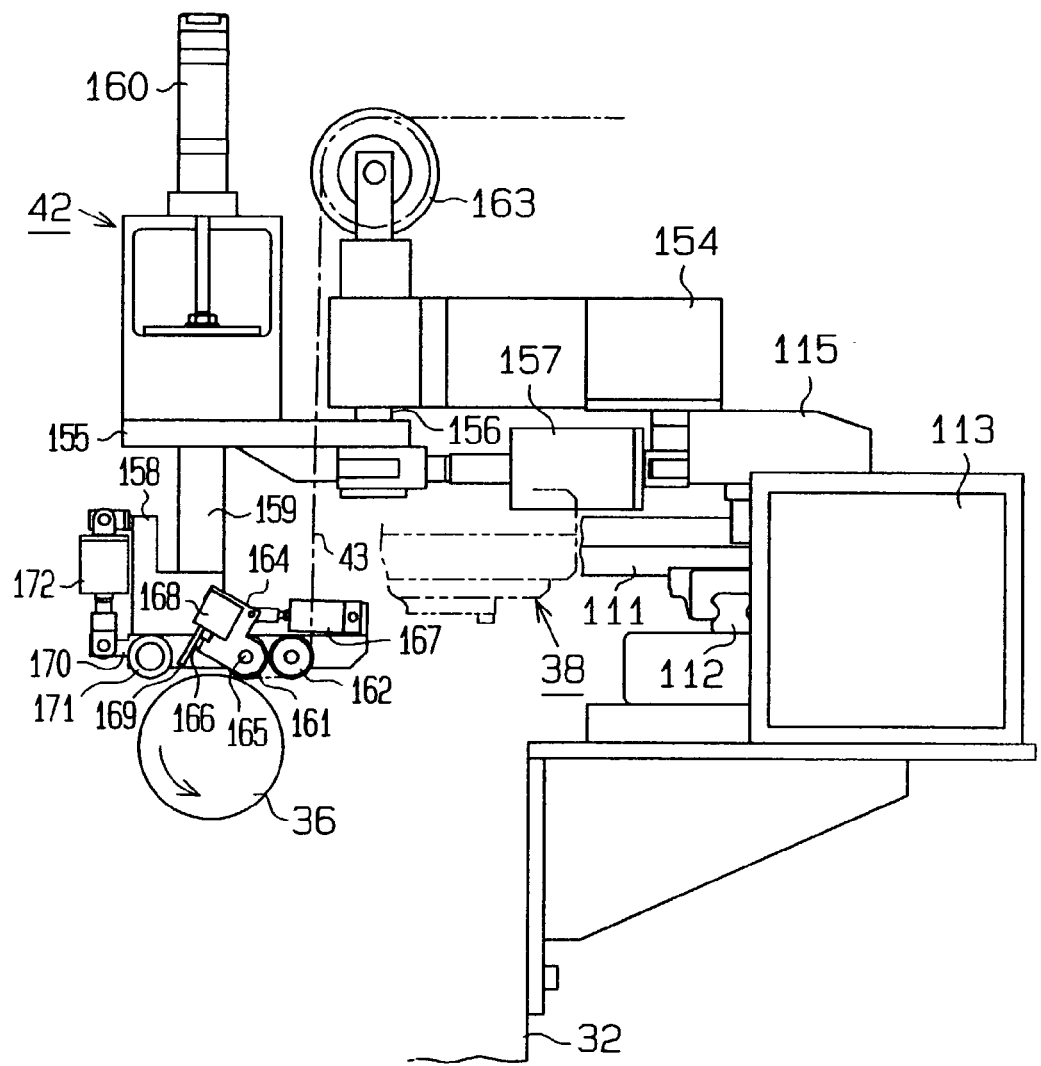
FIG. 14 is an enlarged front view illustrating a main portion of the edge tape winding mechanism of FIG. 13.
Figure 15:
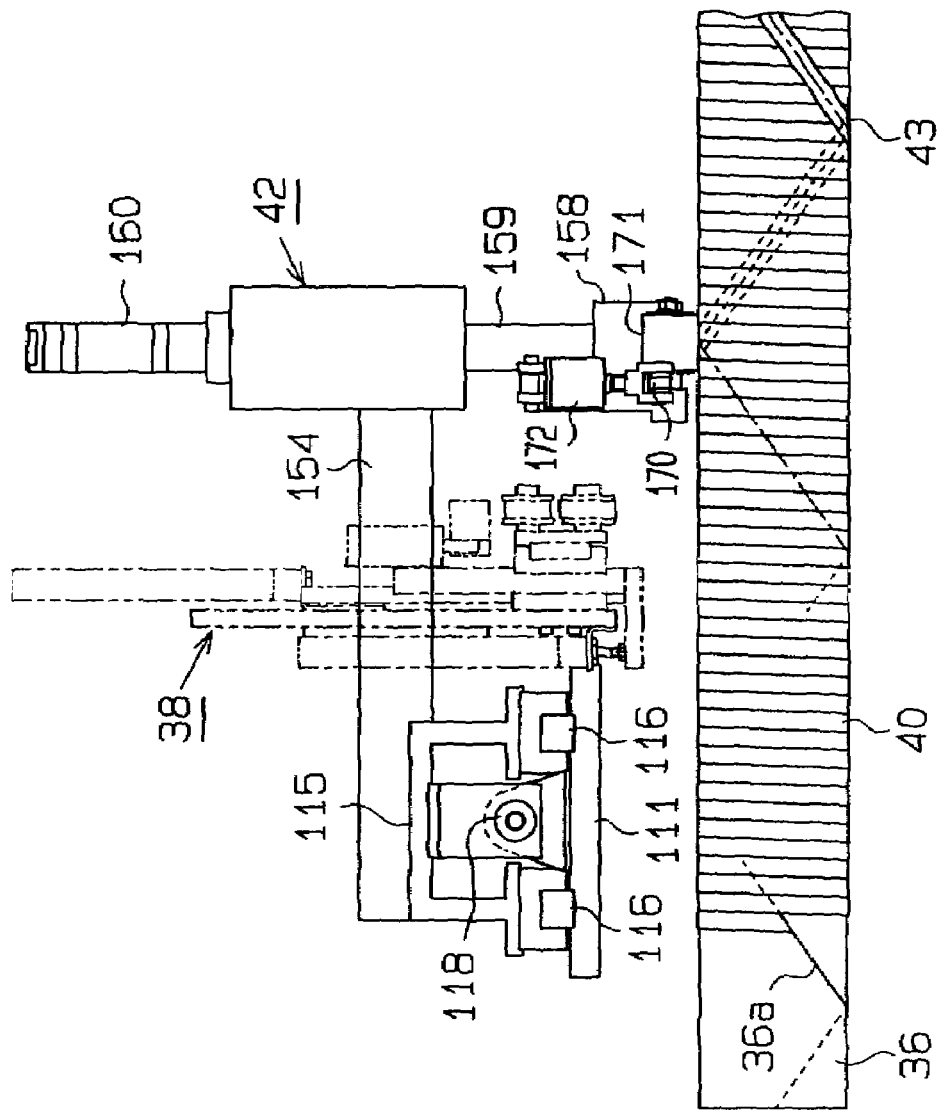
FIG. 15 is an enlarged side view illustrating a main portion of the edge tape winding mechanism of FIG. 13.
Figure 16:
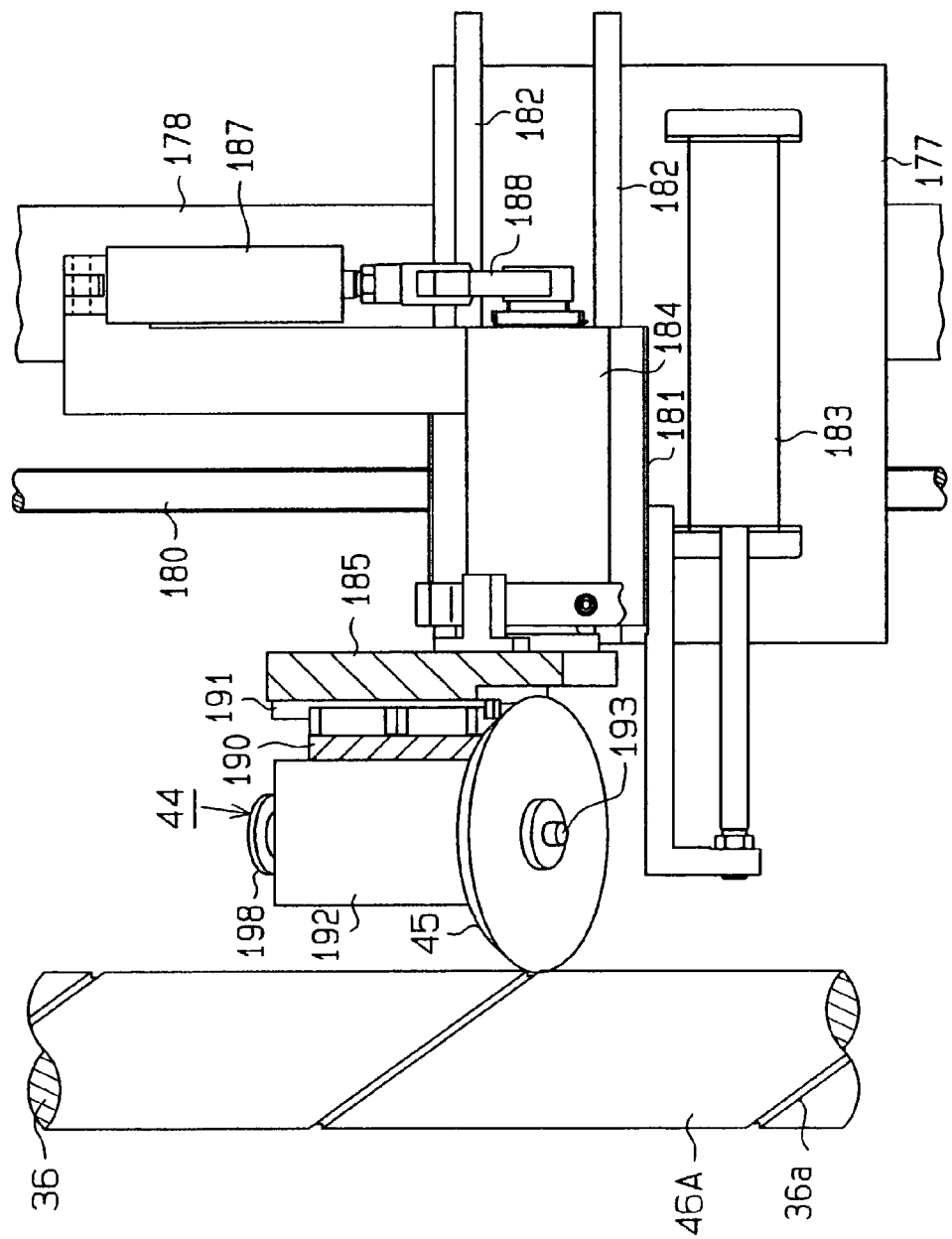
FIG. 16 is an enlarged plan view illustrating a main portion of a wound body cutting mechanism.
Figure 17:
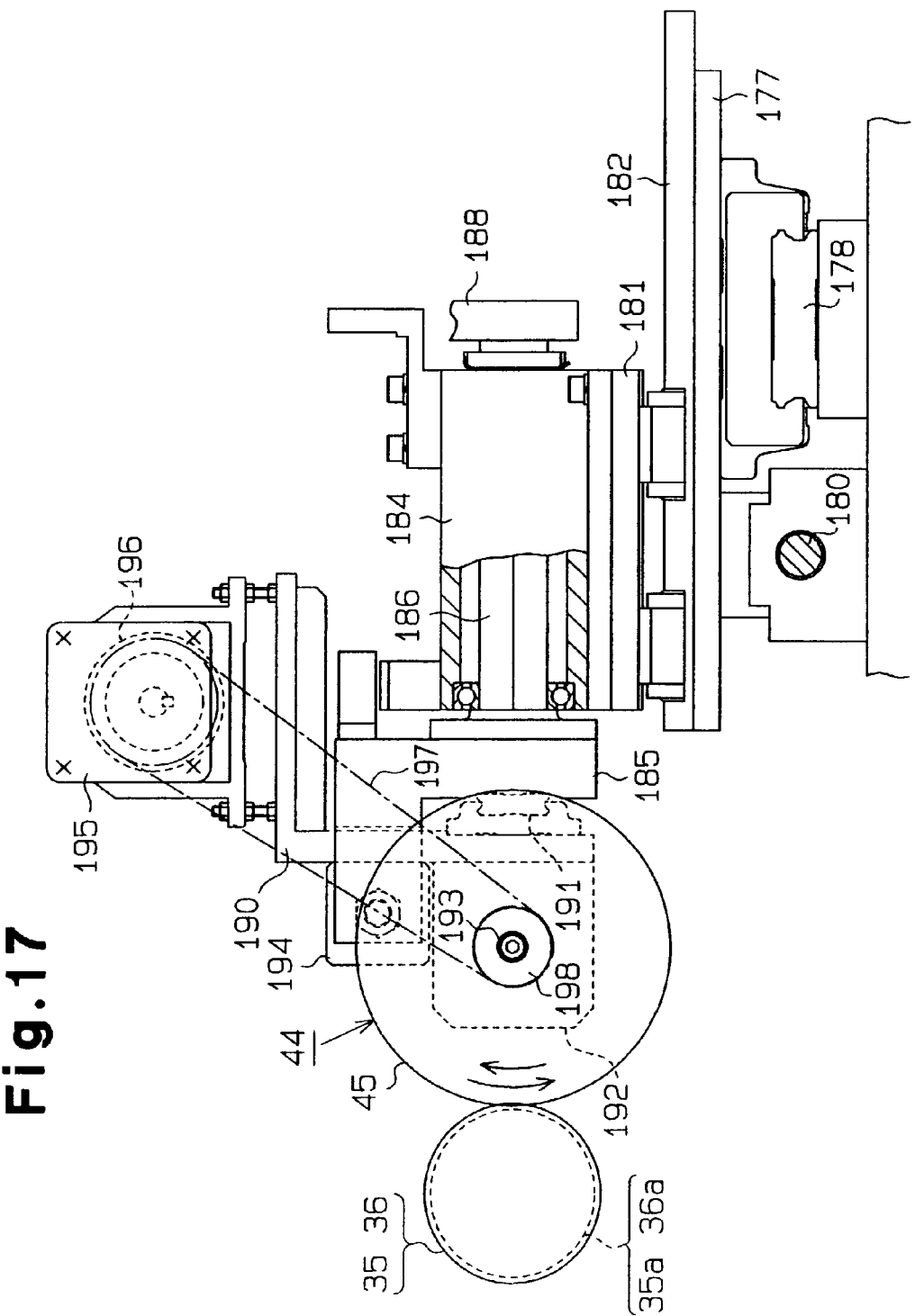
FIG. 17 is a partially cutaway front view of the wound body cutting mechanism of FIG. 16.
Figure 18:
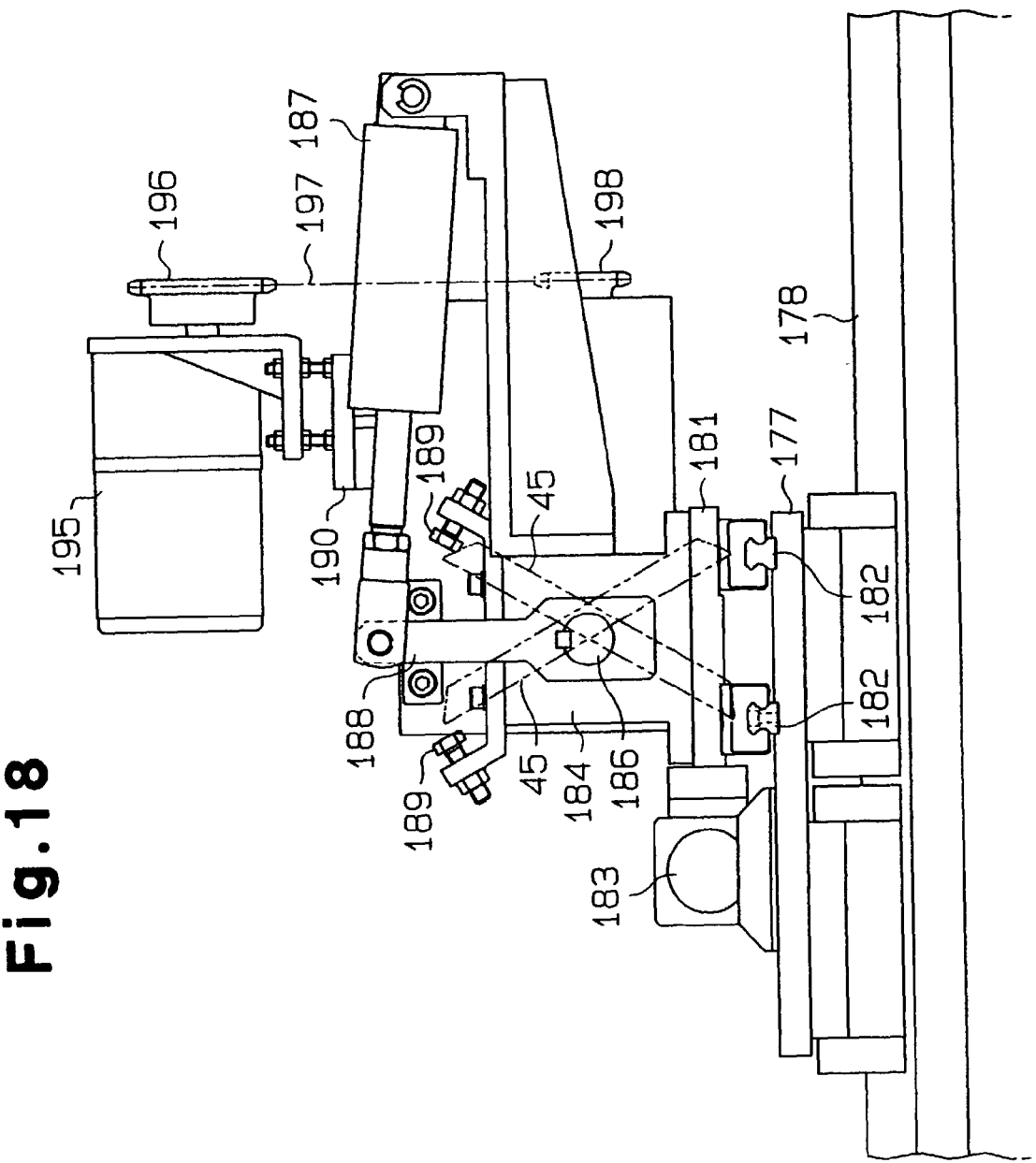
FIG. 18 is a right side view of the wound body cutting mechanism of FIG. 16.
Figure 19:
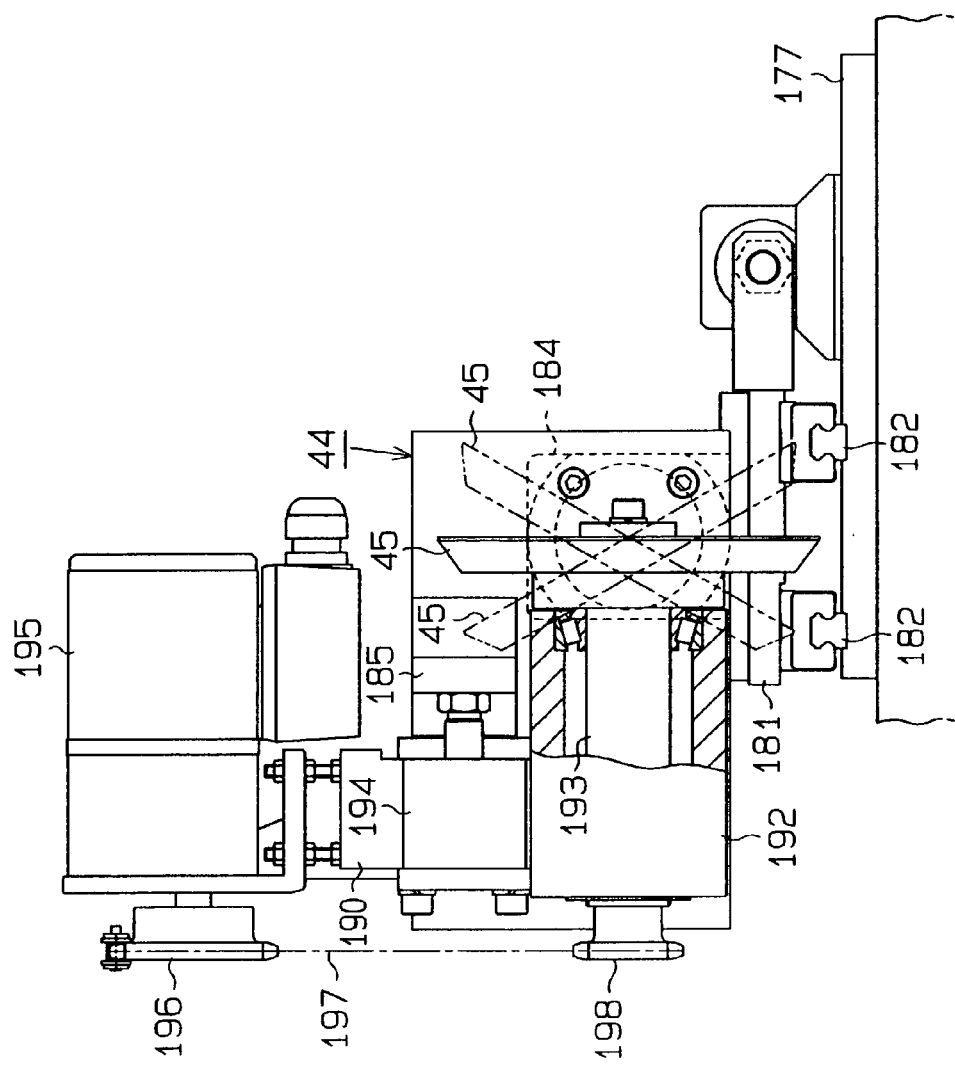
FIG. 19 is a cutaway left side view of a main portion of the wound body cutting mechanism of FIG. 16.

In a front portion of the ribbon winding mechanism 38, an edge tape winding mechanism 42 is disposed integrally movable with and adjacent to the ribbon winding mechanism 38. Then, after the ribbon 39 has been wound up on one drum 36 at the upper position by the ribbon winding mechanism 38 to form a wound body 40, an edge tape 43 is wound around the outer periphery of the wound body 40 along the blade groove 36a of the drum 36 by the edge tape winding mechanism 42, as illustrated in FIGS. 14 and 15.

A wound body cutting mechanism 44 is disposed between both frames 32, 33 for movements in the front-to-rear direction so as to correspond to the right of the drums 35, 36 at the lower position supported by the drum reversing/supporting mechanisms 34. The wound body cutting mechanism 44 is provided with a rotating blade 45 as a cutter which is in the shape of a disk that is engageable with the blade grooves 35a, 36a on the drums 35, 36. This rotating blade 45 has its blade edge pressed against the edges of the blade grooves 35a, 36a. Then, as illustrated in FIGS. 26(b) and 27(b), the wound bodies 40 on the drums 35, 36 are cut along the blade grooves 35a, 36a in cooperation of the rotating blade 45 of the wound body cutting mechanism 44 and the blade grooves 35a, 36a of the drums 35, 36, to form belt materials 46A, 46B having predetermined widths W1, W2.

In this event, since the edge tape 43 is wound along the blade groove 36a on the outer periphery of the wound body 40 on the drum 36, the wound body 40 is cut along the center line of the edge tape 43 in the width direction. In this manner, the edge tape 43 is additionally provided on both side edges of the belt material 46B.

Figure 21:
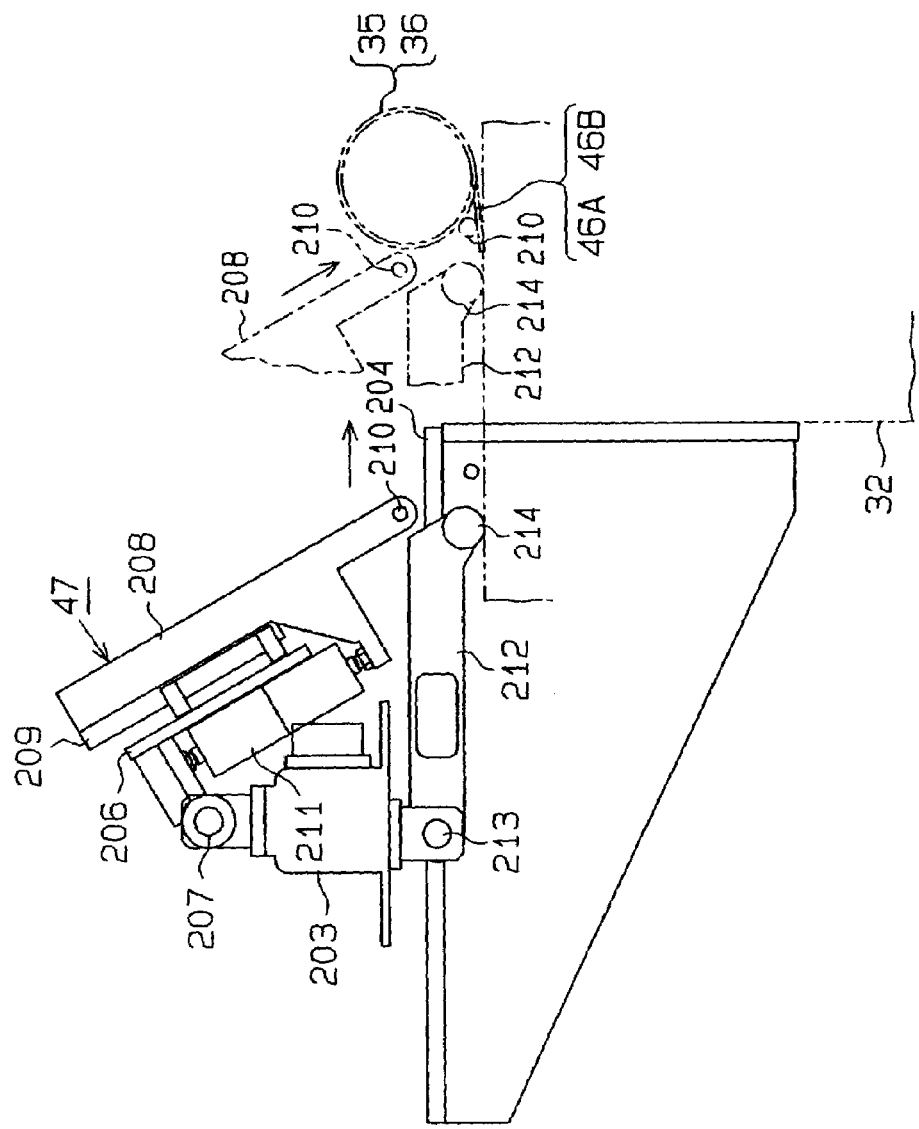
FIG. 21 is an enlarged front view illustrating a main portion of the belt peeling mechanism of FIG. 20.

As illustrated in FIG. 2, a belt material peeling mechanism 47 is disposed between both frames 32, 33 for movements in the front-to-rear direction so as to correspond to the left of the drums 35, 36 at the lower position supported by the drum reversing/supporting mechanisms 34. Then, as illustrated in FIGS. 21, 26(b) and 27(c), the cut belt materials 46A, 46B are peeled from the outer peripheries of the drums 35, 36 by the belt material peeling mechanism 47, and transferred and discharged on a tray 50 of a tray transportation mechanism 48, which will be described later.

The tray transportation mechanism 48 is disposed on the base 31, and a pair of trays 50 are disposed on a moving table 49 for transferring and supporting the belt materials 46A, 46B. Then, as the moving table 49 is moved, the tray 50 is transported from the right side of the base 31 to the left side of the base 31, through the under side of the drums 35, 36 at the lower position, thereby extending and supporting the belt materials 46A, 46B peeled from the outer peripheries of the drums 35, 36 on the tray 50.

Now, the structure of drums 35, 36 and respective mechanisms will be described below in greater detail in order.

(Structure of Drums)

Figure 6:
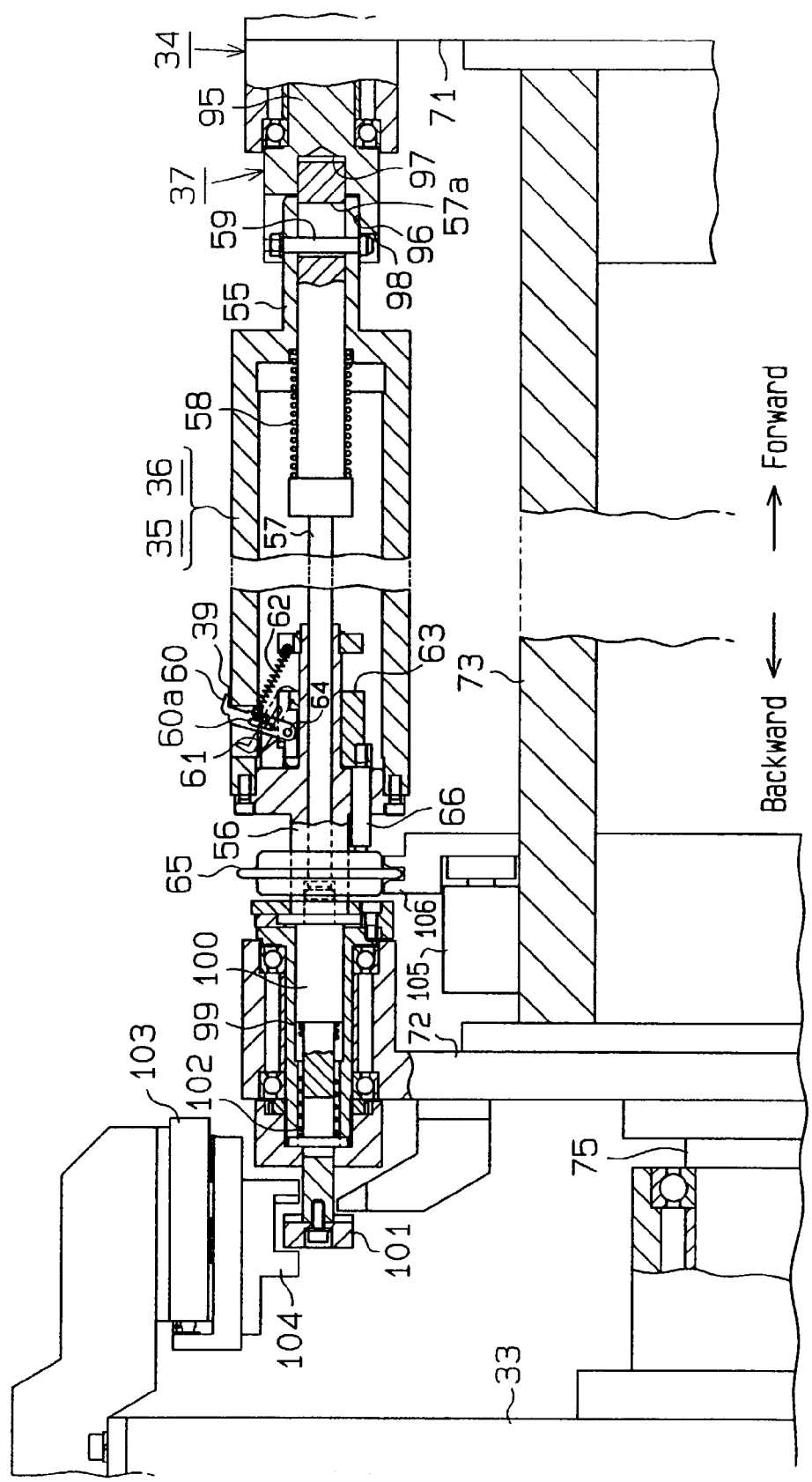
FIG. 6 is an enlarged side sectional view illustrating a main portion of a drum clamp mechanism.

First, the structure of the drums will be described in detail. As illustrated in FIGS. 1, 3 and 6, a pair of drums 35, 36 are formed in the shape of cylinder, and are provided with cylindrical shafts 55, 56 protrusively formed both ends thereof, and with the aforementioned spiral blade grooves 35a, 36a, in different directions, in the outer peripheral surfaces. In this embodiment, the drums 35, 36 are formed such that an outer diameter D1 and a blade groove pitch T2 of one drum 35 having the rightward threaded blade groove 35a as illustrated in FIG. 26 (hereinafter referred to as the first drum) are smaller than an outer diameter D2 and a blade groove pitch T4 of the other drum having the leftward threaded blade groove 36a as illustrated in FIG. 27 (hereinafter referred to as the second drum). Then, a width W1 of a belt material 46A formed by the first drum 35 is narrower than a width W2 of a belt material 46B formed by the second drum 36, and directions in which linear cords 39a of both belt materials 46A, 46B are arranged such that they are bilaterally symmetric.

Also, in this embodiment, a plurality of pairs which are different in the outer diameter and blade groove pitch have been provided as the drums 35, 36. As illustrated in FIG. 2, columns 31A are implanted on both front and rear sides of the base 31, and spare drums 35, 36, different in size, are supported in an upper portion thereof. Then, in accordance with a change in the width and the like of the belt materials 46A, 46B to be manufactured, these drums 35, 36 are selectively mounted and used on the drum clamp mechanism 37, which will be discussed below, by the drum reversing/supporting mechanism 34.

As illustrated in FIG. 6, a knock shaft 57 is axially movably inserted and supported at the center of each of the drums 35, 36, and urged by a spring 58 to move backward. A positioning pin 59, penetrating a front cylindrical shaft 55, is supported thereby, and extends through an elongated hole 57a of the knock shaft 57. At a rear end of each drum 35, 36, a clamp arm 60, forming part of a winding start end grabbing mechanism, is pivotably supported by a supporting pin 61 through an elongated hole 60a, and urged by a spring 62 for pivotal movement in the clockwise direction in FIG. 6. Then, a winding start end of the ribbon 39 is clamped on the outer peripheral surface of the drum 35, 36 by the clamp arm 60.

A slide block 63 is axially movably disposed within a rear end of each of the drums 35, 36, and an inner end of the clamp arm 60 is coupled to a portion of the slide block 63 through a pin 64. A shifter 65 is inserted on and axially movably supported by the rear cylindrical shaft 56, and coupled to the slide block 63 through a coupling rod 66. Then, as the shifter 65 is moved to the front, the slide block 63 is moved in the same direction, so that, as indicated by a chain line in FIG. 6, the clamp arm 60 is pivoted to a position at which the winding start end of the ribbon 39 is released, against the urging force of the spring 62.

(Drum Reversing/Supporting Mechanism)

Figure 4:
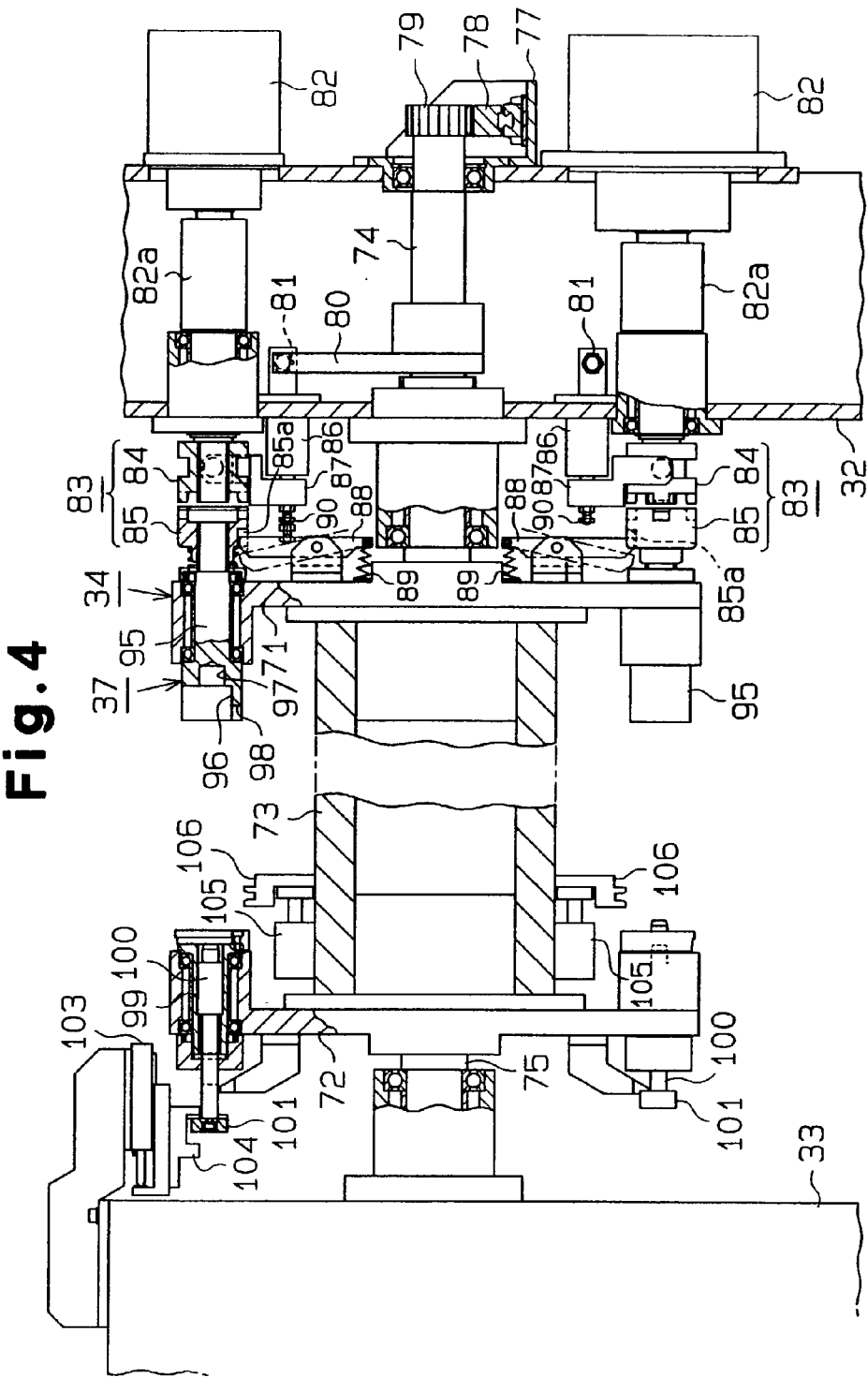
FIG. 4 is an enlarged side sectional view illustrating a main portion of a drum reversing/supporting mechanism.

Next, the drum reversing/supporting mechanism 34 will be described in detail. As illustrated in FIGS. 4 and 6, a pair of reverse supporting plates 71, 72 are rotatably supported between both frames 32, 33 through a reverse shaft 74 and a supporting shaft 75, as they are integrally coupled by a joint beam 73. Then, the pair of drum clamp mechanisms 37 for removably clamping the drums 35, 36 are disposed on the reverse supporting plates 71, 72 spaced by an angular distance of 180°. These drum clamp mechanisms 37 each comprise a holder shaft 95 disposed on the front reverse supporting plate 71, and a rock pin 100 disposed on the rear reverse supporting plate 72, as described later.

Figure 5:
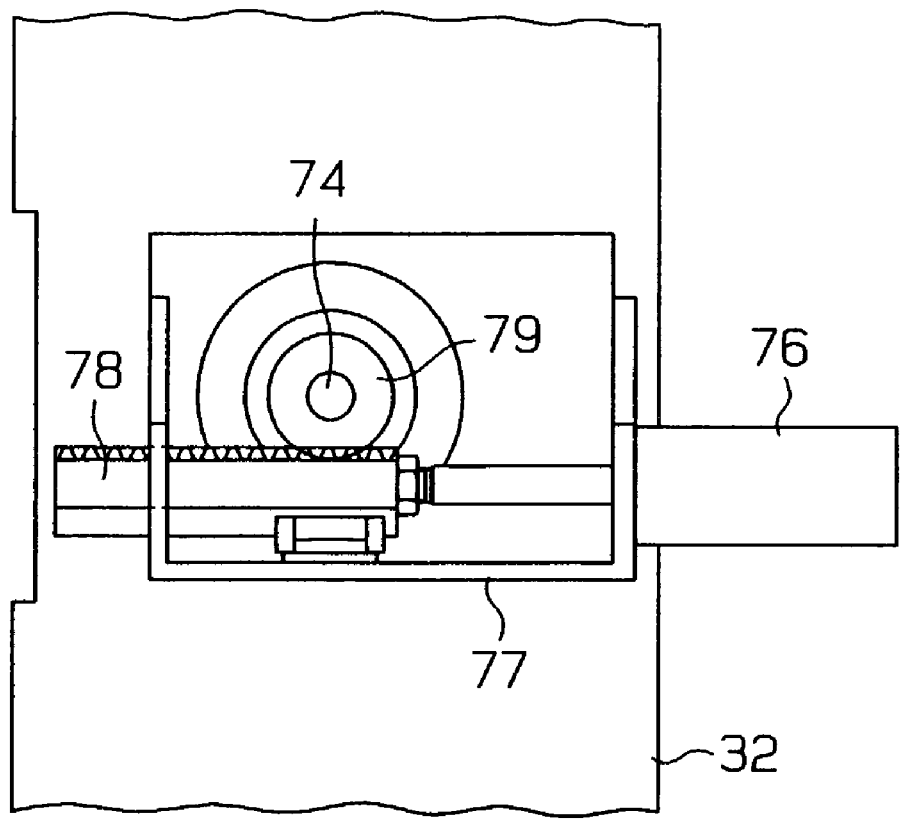
FIG. 5 is a partial front view of the drum reversing/supporting mechanism of FIG. 4.

The front frame 32 is provided with a reverse cylinder 76 through a bracket 77, as illustrated in FIG. 5. The reverse shaft 74 is reversely pivoted over 180 degrees through a rack 78 and a pinion 79 by appearing and disappearing actions of the reverse cylinder 76. Then, the pair of drums 35, 36 supported between both reverse supporting plates 71, 72 through the drum clamp mechanisms 37 are alternately arranged between the upper position and lower position. A stopper arm 80 is provided protruding from the outer periphery of the reverse shaft 74, and the front frame 32 is provided with a pair of stopper bolts 81 so as to correspond to both sides of the stopper arm 80. Then, as the reverse shaft 74 is reversely pivoted, the stopper arm 80 comes in engagement with either one of the stopper bolts 81, so that the drums 35, 36 are positioned at the upper position or lower position.

As illustrated in FIG. 4, a pair of drum rotating motors 82 are disposed in the front frame 32 so as to correspond to the drums 35, 36 arranged at the upper position and lower position. A clutch mechanism 83 is disposed between a motor shaft 82a of each motor 82 and a holder shaft 95 of each drum clamp mechanism 37. These clutch mechanisms 83 each include a first clutch tab 94 movably inserted into and supported by the motor shaft 82a, and a second clutch tab 85 fixed to the holder shaft 95. A pair of engagement/disengagement cylinder 86 are disposed in the front frame 32 so as to correspond to the first clutch tabs 84 of the respective drum clamp mechanisms 37. Then, the first clutch tabs 84 are brought into engagement with and disengaged from the second clutch tabs 85 through shifters 87 by appearing and disappearing actions of these engagement/disengagement cylinders 86.

A pair of rock arms 88 are pivotally supported by the front reverse supporting plate 71 so as to correspond to the second clutch tabs 85 of the respective drum clamp mechanisms 37. Then, when both cluth tabs 84, 85 of each drum clamp mechanism 37 are not in engagement, the rock arms 88 are urged by springs 89 for pivotal movements to positions at which they come in engagement with engaging recesses 85a of the second clutch tabs 85, as indicated by solid lines in FIG. 4, to restrain free rotations of the drums 35, 36. On the other hand, when both clutch tabs 84, 85 are in engagement by protruding actions of the engagement/disengagement cylinders 86, the lock arms 88 are moved away from the engaging recesses 85a of the second clutch tabs 85 through push bolts 90, as indicated by chain lines in FIG. 4, so that the drums 35, 36 are permitted to rotate.

(Drum Clamp Mechanism)

Next, the pair of drum clamp mechanisms 37 will be described in detail. As illustrated in FIGS. 4 and 6, a pair of holder shafts 95 are rotatably supported by the front reverse supporting plate 71 of the drum reversing/supporting mechanism 34, and an engaging recess 96, an engaging hole 97, and a positioning groove 98 are formed in an end portion thereof. Then, when the drums 35, 36 are mounted between both reverse supporting plates 71, 72 of the drum reversing/supporting mechanism 34, the cylindrical shaft 55, knock shaft 57 and positioning pin 59 of each drum 35, 36 are brought into engagement with the engaging recess 96, engaging hole 97, and positioning groove 98 of the holder shaft 95.

A pair of supporting cylinders 99 are rotatably supported by the rear reverse supporting plate 72 of the drum reversing/supporting mechanism 34 so as to correspond to the respective holder shafts 95. In each of the supporting cylinders 99, a lock pin 100 is axially movably supported, and an engaging ring 101 is attached to the rear end thereof. Then, as the lock pins 100 are urged by springs 102 to move to the front, front ends of the lock pins 100 are inserted into and engaged with the rear cylindrical shafts 56 of the drums 35, 36. This causes the knock shafts 57 to move to the front against the urging forces of the springs 58, so that the front ends of the knock shafts 57 are inserted into and engaged with the engaging holes 97 of the holder shafts 95.

Above the rear frame 33, a drum releasing cylinder 103 is disposed, with its piston rod mounted with an actuating hook 104. Then, as the drums 35, 36 supported between both reverse supporting plates 71, 72 of the drum reversing/supporting mechanism 34 are reversely brought to the upper position, the engaging ring 101 on the lock pin 100 is correspondingly disposed to be engageable with the actuating hook 104. By protruding the drum releasing cylinder 103 in this state, the lock pin 100 is moved backward, and the drums 35, 36 are extracted from the rear cylinder shafts 56. Associated therewith, the knock shafts 57 within the drums 35, 36 are moved back by the urging forces of the springs 58, extracted from the engaging holes 97 of the holder shafts 95, thereby releasing the drums 35, 36 clamped by the drum clamp mechanism 37.

A pair of ribbon releasing cylinders 105 are disposed on the outer periphery of the joint beam 73 between both reverse supporting plates 71, 72, and their piston rods are mounted with actuation forks 106 which are engageable with the shifters 65 on the respective drums 35, 36. Then, protruding actions of the ribbon releasing cylinders 105 cause the shifters 65 to move to the front through the actuation forks 106 to pivot the clamp arms 60 to releasing positions indicated by chain lines in FIG. 6, thereby releasing the ribbon 39 clamped to the outer peripheries of the drums 35, 36.

(Ribbon Winding Mechanism)

Figure 7:
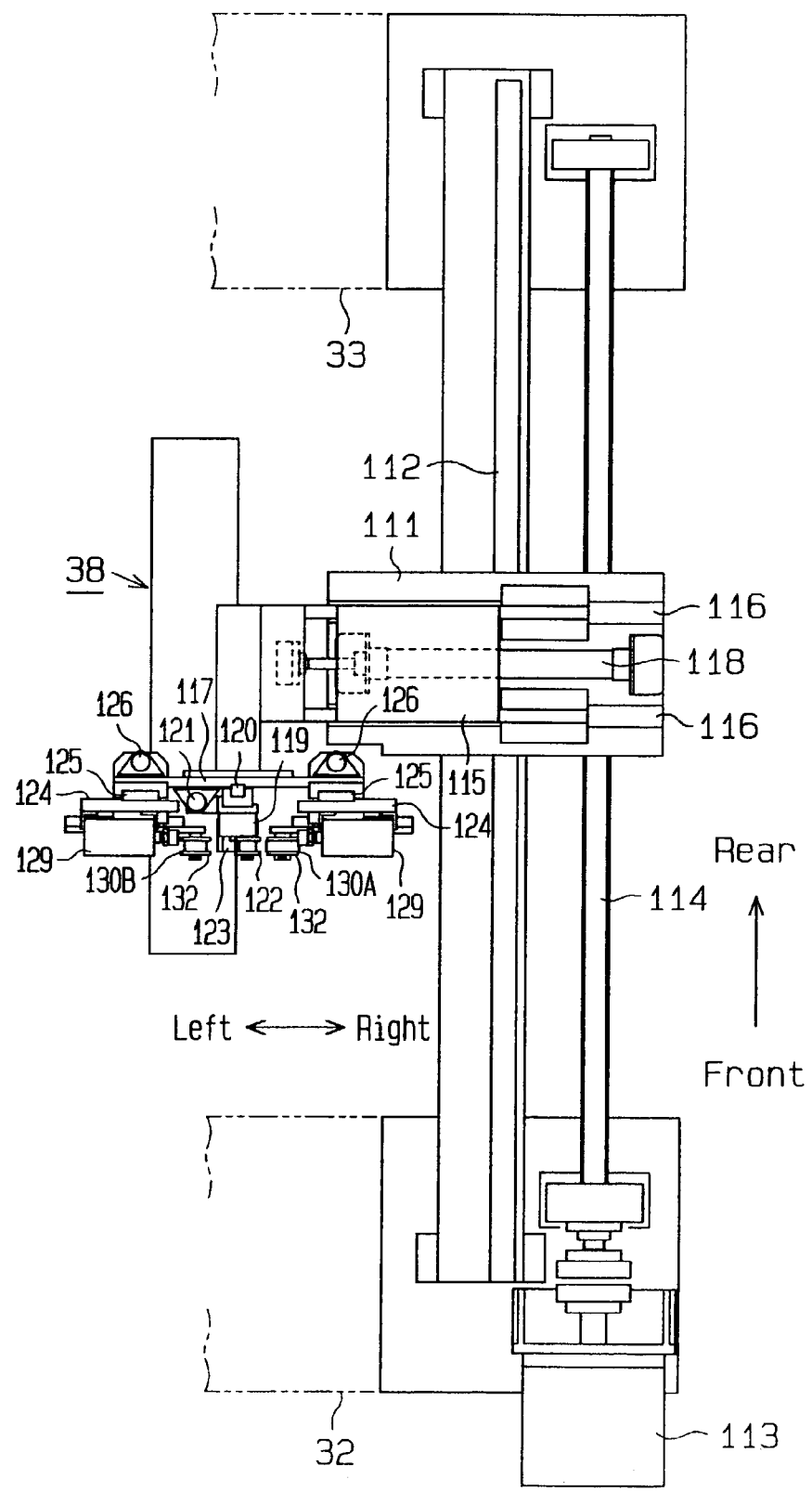
FIG. 7 is an enlarged plan view illustrating a ribbon winding mechanism in the manufacturing device.

Next, the ribbon winding mechanism 38 will be described in detail. As illustrated in FIGS. 7 to 9, a moving stand 111 is supported between both frames 32, 33 for movement in the front-to-rear direction through a guide rail 112, so that the moving stand 111 is moved by a feeding motor 113 through a feed screw 114. On the moving stand 111, a fixture 115 is supported through a pair of guide rails 116 for movement in the right-to-left direction, and an attachment plate 117 is disposed on a front left side thereof, extending in the vertical direction. Then, appearing and disappearing actions of a switch position cylinder 118 cause the fixture 115 to move to the left or to the right, so that the attachment plate 117 is switched between the left and right positions.

A clamp slider 119 is supported at the center of a front surface of the attachment plate 117 to move up and down through a guide rail 120, so that the clamp slider 119 is moved up and down by an elevating cylinder 121. On a lower front surface of the clamp slider 119, a guide roller 122 is rotatably supported for guiding the ribbon 39 supplied from a ribbon supply source, not shown, and a clamp block 123 is supported for releasably clamping the ribbon 39 between the guide roller 122 and the clamp block 123. Also, above the clamp slider 119, a clamp cylinder 123a is disposed for moving the clamp block 123 between a clamp position and a release position.

Then, when winding of the ribbon 39 is started around the outer peripheries of the drums 35, 36 arranged at the upper position, the clamp slider 119 is moved down by the elevating cylinder 121 from the upper position indicated by solid lines in FIG. 8 to the lower position indicated by chain lines, with the end of the ribbon 39 clamped between the guide roller 122 and clamp block 123. In this manner, the end of the ribbon 39 is guided to the outer peripheries of the drums 35, 36.

A pair of elevating plates 124 are supported on both sides of a front surface of the attachment plate 117 to move up and down through a guide rail 125, so that the elevating plates 124 are moved by the elevating cylinder 126 between an upper retreating position and a lower preparatory position. On a front surface of each elevating plate 124, a supporting plate 127 is supported for movement in the right-to-left direction through a guide rail 128, so that the supporting plate 127 is moved by a moving cylinder 129 between an inactive position on the outside and an active position on the inside, as indicated by solid lines in FIG. 8. Each supporting plate 127 is provided on its inner side with winding guides 130A, 130B comprised of a press roller 131 for pressing the ribbon 39 onto the outer peripheries of the drum 35, 36, and a grooved guide roller 132 for guiding the feeding of the ribbon 39.

Then, with one of the winding guides 130A, 130B being arranged at the lower preparatory position corresponding to the drum 35, 36 by the lowering of the elevating plate 124, after the end of the ribbon 39 is led to the outer peripheries of the drums 35, 36, associated with the lowering movement of the clamp slider 119, the winding guides 130A, 130B are moved to the inner active positions. In this manner, the ribbon 39 is pressed onto the outer peripheries of the drums 35, 36 by the press rollers 131 of the winding guides 130A, 130B, and the feed of the ribbon 39 is guided by the guide roller 132. In this state, the drums 35, 36 are rotated by the drum rotating motor 82, while the winding guides 130A, 130B are moved in the axial direction of the drums 35, 36 by the feeding motor 113, thereby spirally winding the ribbon 39 on the outer peripheries of the drums 35, 36. Both side edges of the ribbon 39 are stuck to each other to form a wound body 40.

The pair of winding guides 130A, 130B are selectively used when the ribbon 39 is wound around the drums 35, 36 in which the blade grooves 35a, 36a are formed in different directions. Specifically, as illustrated in FIGS. 8, 9 and 26(a), for winding the ribbon 39 around the outer periphery of the first drum 35 having the rightward threaded blade groove 35a, the first drum 35 is rotated in the clockwise direction in FIGS. 8 and 26(a), while the right-hand winding guide 130A is moved to the front along the first drum 35. By this operation, the ribbon 39 is spirally wound around the outer periphery of the first drum 35 from its right side in the right direction identical to the blade groove 35a.

On the other hand, as illustrated in FIG. 27(a), for winding the ribbon 39 around the outer periphery of the second drum 36 having the leftward threaded blade groove 36a, the second drum 35 is rotated in the counter-clockwise direction in FIG. 27(a), while the left-hand winding guide 130B is moved to the front along the second drum 36. By this movement, the ribbon 39 is spirally wound around the outer periphery of the second drum 36 from its left side in the left direction identical to the blade groove 36a.

(Ribbon Cutting Mechanism)

Figure 10:
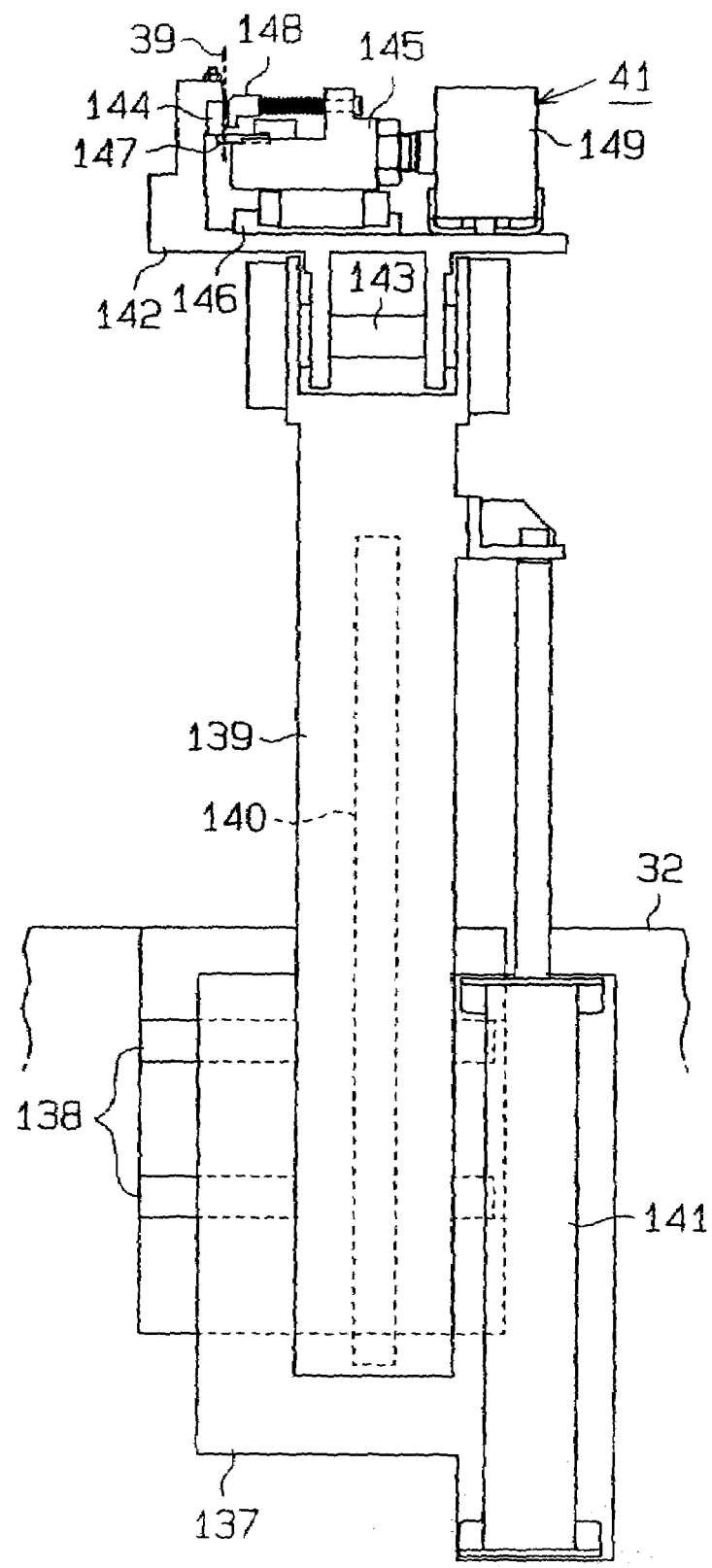
FIG. 10 is an enlarged plan view illustrating a ribbon cutting mechanism in the manufacturing device.
Figure 11:
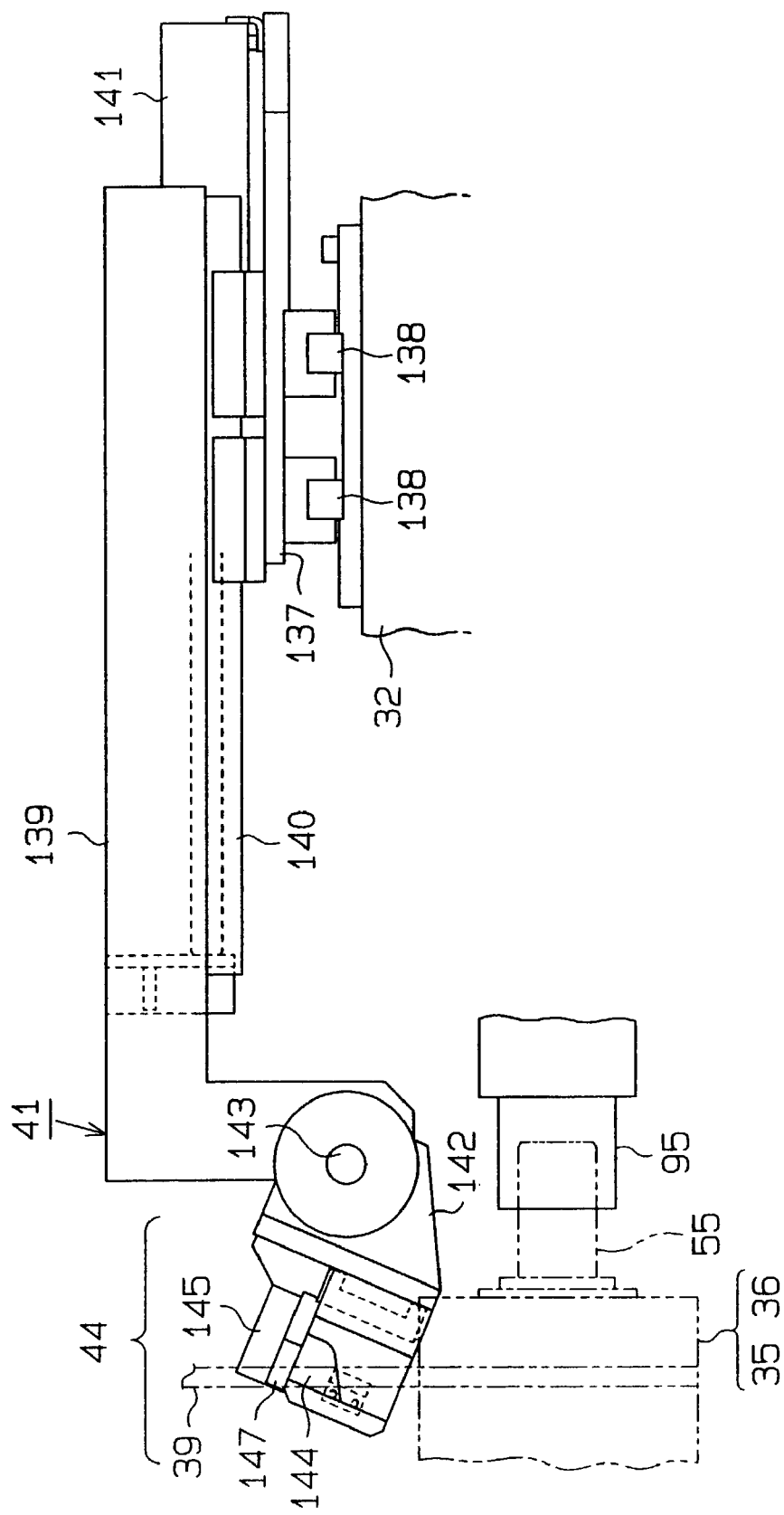
FIG. 11 is a side view of the ribbon cutting mechanism of FIG. 10.
Figure 12:
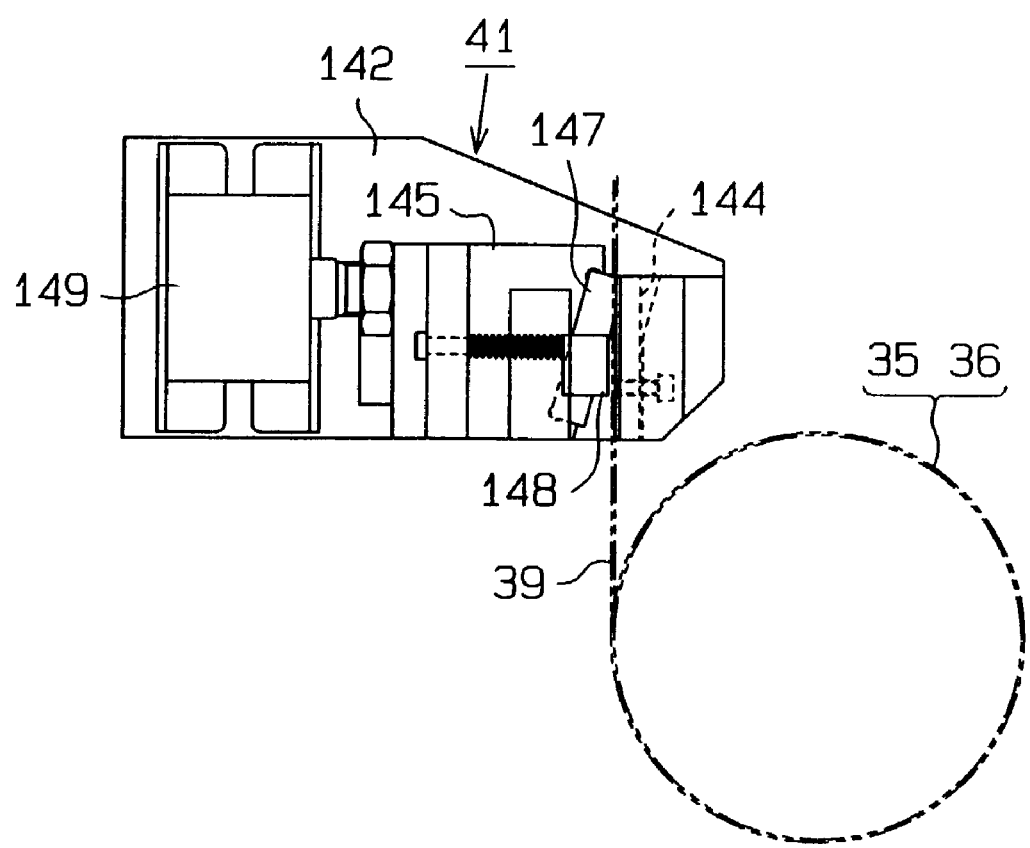
FIG. 12 is a back view of a main portion of the ribbon cutting mechanism of FIG. 10.

Next, the ribbon cutting mechanism 41 will be described in detail. As illustrated in FIGS. 10 to 12, in this embodiment, a pair of the ribbon cutting mechanisms 41 are disposed side by side in an inside upper portion of the front frame 32, corresponding to movement end points of a pair of right and left winding guides 130A, 130B in the ribbon winding mechanism 38. In each ribbon cutting mechanism 41, an attachment plate 137 is disposed on the front frame 32 through a pair of guide rails 138 for movement in the right-to-left direction, so that the attachment plate 137 is moved for adjustment in accordance with the outer diameters of the drums 35, 36. A supporting arm 139 is supported on the attachment plate 137 through a guide rail 140 for the back-to-forth, so that the supporting arm 139 is moved by a moving cylinder 141 between a rear active position and a front inactive position.

A cutter base 142 is pivotally supported at a distal end of the supporting arm 139 through a supporting pin 143, and a fixed blade 144 is attached to a portion of the cutter base 142. A slider 145 is movably supported on the cutter base 142 through a guide rail 146, and a movable blade 147 corresponding to the fixed blade 144 and a presser member 148 are attached on the surface of the slider 145. Then, as the slider 145 is moved by a cutter cylinder 149, the end of the ribbon 39 wound around the drums 35, 36 is pressed onto the fixed blade 144 by the presser member 148, and cut in cooperation of the fixed blade 144 and movable blade 147.

For cutting the ribbon 39, the cutter base 142 may be previously pivoted about the supporting pin 143 for adjustment such that cutting faces of both blades 144, 147 are set to form a predetermined angle to a direction in which the ribbon 39 is supplied, whereby the end of the ribbon spirally wound around the drums 35, 36 can be cut along the outer peripheral surfaces of the drums 35, 36.

(Edge Tape Winding Mechanism)

Figure 13:
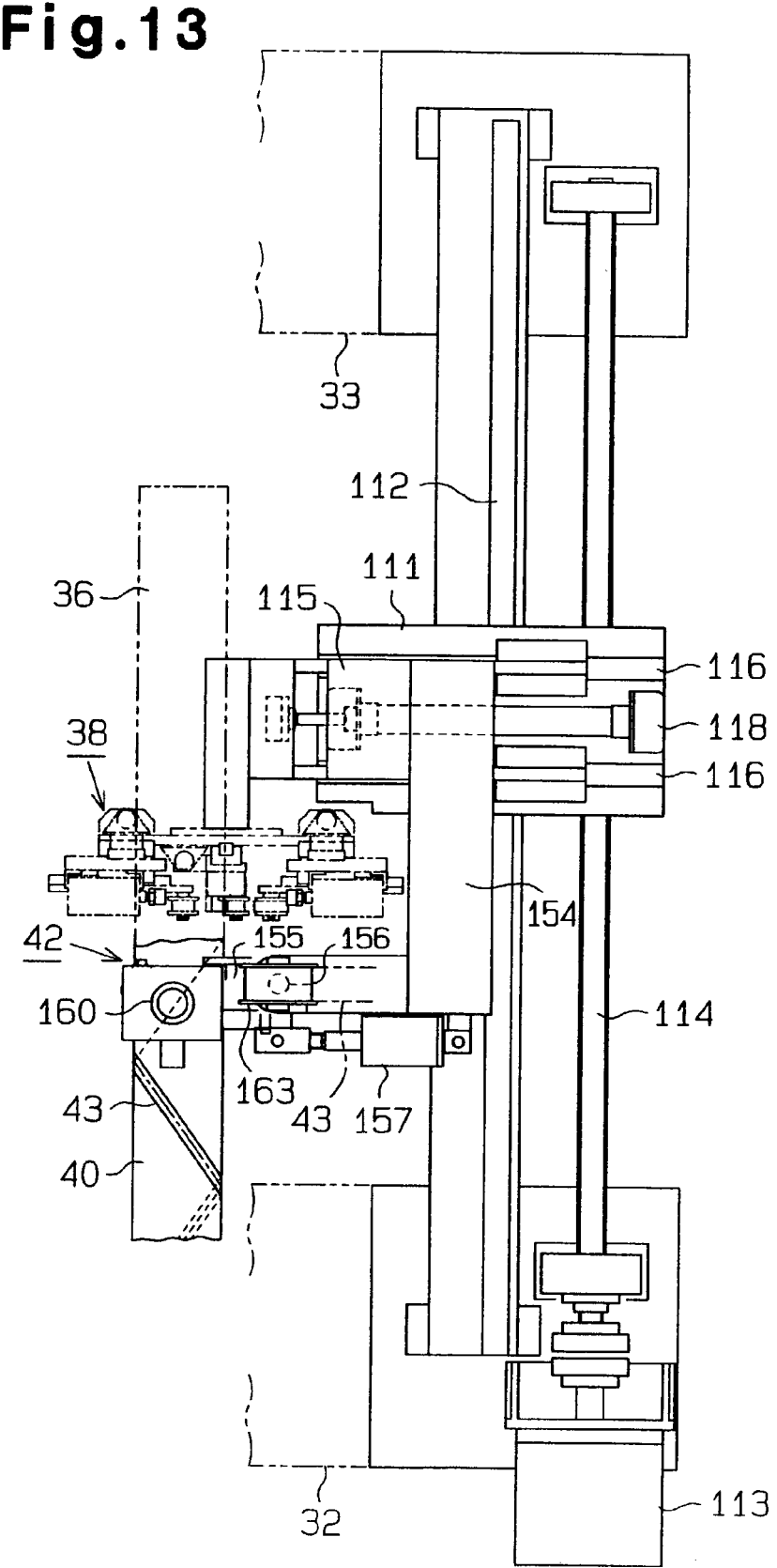
FIG. 13 is an enlarged plan view illustrating an edge tape winding mechanism.

Next, the edge tape winding mechanism 42 will be described in detail. As illustrated in FIGS. 13 to 15, an attachment arm 154 is fixed on the fixture 115 of the ribbon winding mechanism 38 and extended toward the front. A swing plate 155 is pivotally supported in a lower portion of a distal end of the attachment arm 154 through a supporting shaft 156, such that the swing plate 155 is swung by a swinging cylinder 157 between an active position corresponding to the second drum 36 at the upper position and an inactive position retreated therefrom. Below the swing plate 155, a supporting block 158 is supported to move up and down through a supporting rod 159, such that the supporting block is moved by the elevating cylinder 160 between a lower active position corresponding to the second drum 36 and an inactive position spaced apart therefrom.

A presser roller 161 and a guide roller 162 are rotatably supported by the supporting block 158. Then, with the supporting block 158 remaining at the lower active position, the edge tape 43 is pressed onto the outer periphery of the wound body 40 formed on the second drum 36 by the presser roller 161. In this state, as the second drum 36 is rotated in the counter-clockwise direction in FIGS. 14 and 27(b), the presser roller 161 and guide roller 162 are moved to the front together with the moving stand 111. By this movement, the edge tape 43 supplied from a tape supply source, not shown, is led to the outer periphery of the wound body 40 on the second drum 36 through the guide roller 163 on the attachment arm 154, the guide roller 162 on the supporting block 158, and the presser roller 161, and spirally wound along the blade groove 36a of the second drum 36.

A supporting shaft 165 of a cutter holder 164 is pivotally supported by the supporting block 158, and a fixed blade 166 is attached to a portion of the cutter holder 164. Then, the cutter holder 164 is pivoted by a cutter advance/retreat cylinder 167 to bring the fixed blade 166 to and retreat the same from a position at which the edge tape 43 is cut. A cutter actuating cylinder 168 is disposed on the cutter holder 164, and a movable blade 169 is attached to a piston rod thereof. Then, with the fixed blade 166 maintained at the cutting position, the movable blade 169 is actuated by the cutter actuating cylinder 168 to cut the winding end of the edge tape 43.

A supporting arm 170 is pivotably supported by the supporting block 158, and a pressure roller 171 is rotatably supported on a front surface of the supporting arm. Then, when the winding end of the edge tape 43 is cut in cooperation of the fixed blade 166 and movable blade 169, the supporting arm 170 is pivoted by a presser cylinder 172, so that the edge tape 43 is pressed onto the outer periphery of the second drum 36 by the pressure roller 171.

(Wound Body Cutting Mechanism)

Next, the wound body cutting mechanism 44 will be described in detail. As illustrated in FIGS. 2 and 16 to 19, a moving stand 177 is supported between both frames 32 and 33 through a guide rail 178 for movement in the front-to-rear direction, so that the moving stand 177 is moved by a feeding motor 179 through a feed screw 180. On the moving stand 177, a supporting plate 181 is supported through a pair of guide rails 182 for movement in the right-to-left direction, so that the supporting plate 181 is moved by a moving cylinder 183 between a leftward active position proximate to the drums 35, 36 at the lower position and a right-hand inactive position spaced apart from the drums 35, 36.

A swing plate 185 is swingably supported by a bearing case 184 on the supporting plate 181 through a swing shaft 186, so that the swing plate 185 is swung by a swing cylinder 187 at two front and rear inclined positions through a pivotal lever 188. A pair of stopper bolts 189 are disposed on the top surface of the bearing case 184 so as to correspond to the front and rear sides of the pivotal lever 188, such that as the swing plate 185 is swung, the stopper bolts 189 are engaged with the pivotal lever 188 to restrain a swingable range of the swing plate 185 on both sides.

A bracket 190 is supported on a side surface of the swing plate 185 through a guide rail 191 for movement in the front-to-rear direction, and a cutter holder 192 is attached to a side surface thereof. The discoidal rotating blade 45 is rotatably supported by the cutter holder 192 through a rotating shaft 193. Then, as the swing plate 185 is swung, the rotating blade 45 is moved to the front inclined position or rear inclined position, and brought into engagement with the rightward threaded blade groove 35a on the first drum 35 or the leftward threaded blade groove 36a on the second drum 36.

A pressing cylinder 194 is disposed on a side surface of the bracket 190. A protruding action of the pressing cylinder 194 presses the swing plate 185 to move to the front, causing the rotating blade 45 to be pressed onto front edges of the blade grooves 35a, 36a of the drums 35, 36. A cutter motor 195 is disposed on the top surface of the bracket 190, and the rotation of the cutter motor 195 causes the rotating blade 45 to rotate in the clockwise direction or counter-clockwise direction in FIG. 17 through a sprocket 196, chain 197 and sprocket 198.

When the first drum 35 having the rightward threaded blade groove 35a is reversely moved to the lower position corresponding to the wound body cutting mechanism 44, the first drum 35 is rotated in the clockwise direction, while the rotating blade 45 is rotated in the counter-clockwise direction in a forward tilted posture, and moved forward, as illustrated in FIG. 26(b). By this movement, the wound body 40 on the first drum 35 is spirally cut along the blade groove 35a in cooperation of the rotating blade 45 and blade groove 35a to form a belt material 46A.

On the other hand, when the second drum 36 having the leftward threaded blade groove 36a is reversely moved to the lower position corresponding to the wound body cutting mechanism 44, the second drum 36 is rotated in the clockwise direction, while the rotating blade 45 is rotated in the counter-clockwise direction in a backward tilted posture, and moved backward, as illustrated in FIG. 27(c). By this operation, the wound body 40 on the second drum 36 is spirally cut along the blade groove 36a in cooperation of the rotating blade 45 and blade groove 36a to form a belt material 46B which is wider than and opposite to the belt material 46A in the direction in which the linear cords 39a are arranged. In this event, the edge tape 43 wound around the outer periphery of the wound body 40 is also cut along the center line in the width direction, so that the edge tape 43 is additionally provided on both side edges of the belt material 46B.

(Belt Material Peeling Mechanism)

Figure 20:
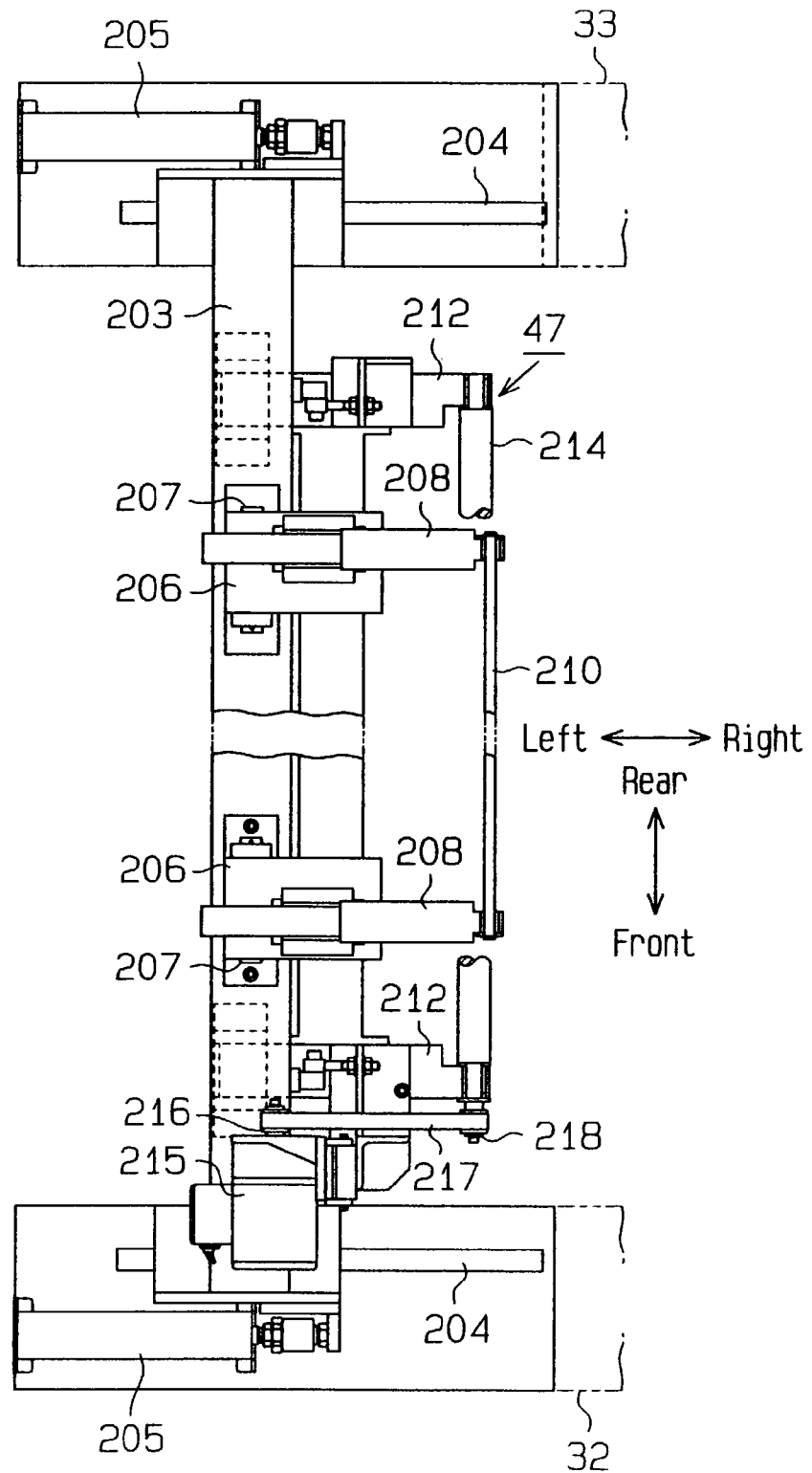
FIG. 20 is an enlarged plan view illustrating a main portion of a belt material peeling mechanism.
Figure 22:
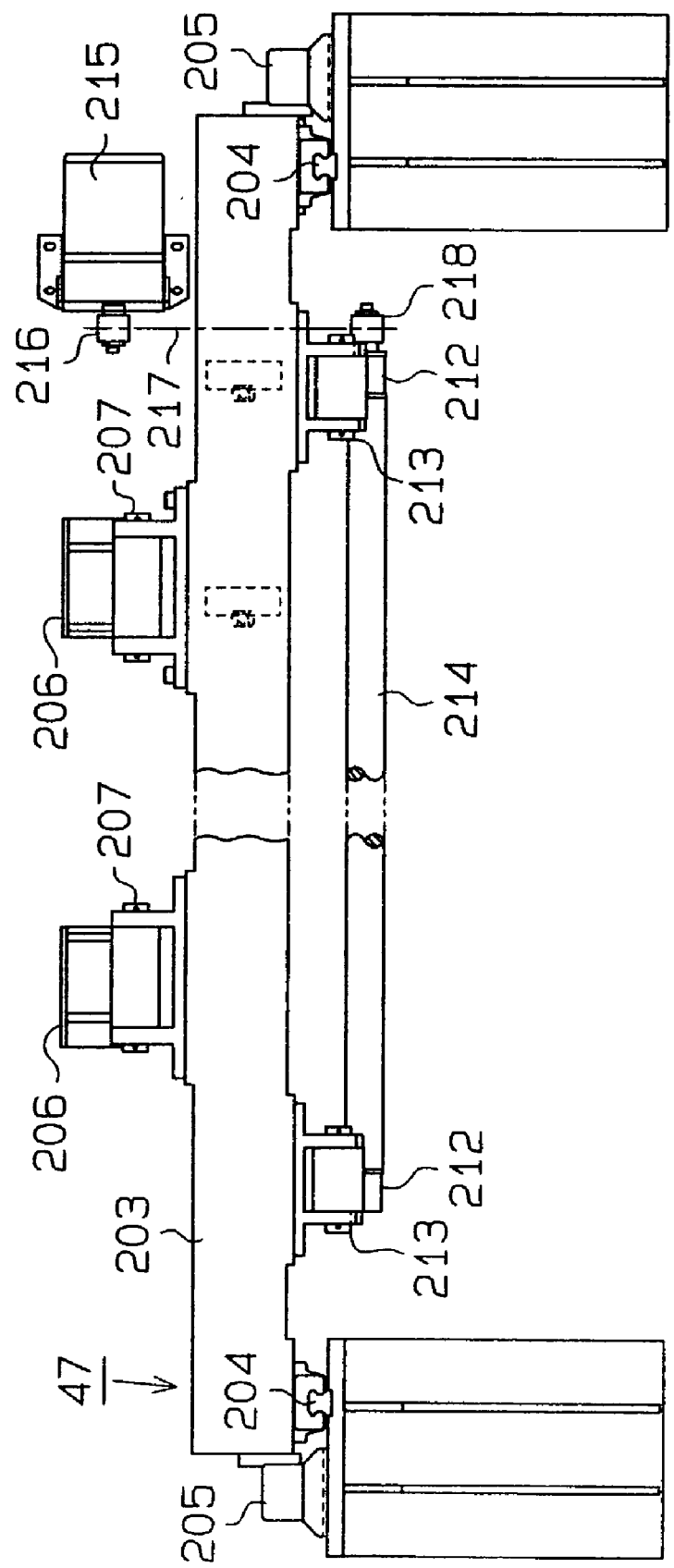
FIG. 22 is an enlarged side view illustrating a main portion of the belt material peeling mechanism of FIG. 20.

Next, the belt material peeling mechanism 47 will be described in detail. As illustrated in FIGS. 20 to 22, an attachment beam 203 is supported between both frames 32 and 33 through a guide rail 204 for movement in the right-to-left direction, so that the attachment beam 203 is moved by a pair of moving cylinders 205 between a right-hand active position proximate to the drums 35, 36 at the lower position, and a left-hand inactive position retreated therefrom. A pair of supporting plates 206 are pivotably adjustably supported on the top surface of the attachment beam 203 through a supporting pin 207, and a slide arm 208 is supported on a side surface of each supporting plate 206 through a guide rail 209 for movement in the vertical direction.

A peeling shaft 210 is supported between lower ends of both slide arms 208. Then, as indicated by chain lines in FIG. 21, with a movement of the attachment beam 203, the peeling shaft 210 is moved to and maintained at the active position proximate to the drums 35, 36, and the slide arm 208 is moved down by a peeling cylinder 211. By this movement, the peeling shaft 210 is introduced between the outer peripheral surfaces of the drums 35, 36 and the edges of the belt materials 46A, 46B after cutting. In this state, as the drums 35, 36 are rotated to gradually form the belt materials 46A, 46B, the belt materials 46A, 46B are peeled from the outer peripheral surfaces of the drums 35, 36 by the peeling shaft 210.

On the bottom surface of the attachment beam 203, a pair of supporting arms 212 are pivotably adjustably supported through a supporting pin 213, and a presser roller 214 is rotatably supported between distal ends of these supporting arms 212. A roller rotating motor 215 is disposed in a front end upper portion of the attachment beam 203, and the rotation of the motor 215 causes the presser roller 214 to rotate through a pulley 216, a belt 217 and a pulley 218. Then, as indicated by chain lines in FIG. 21, with a movement of the attachment beam 203, the presser roller 214, arranged at the active position proximate to the drums 35, 36, is rotated. By this rotation, the belt materials 45A, 46B peeled from the drums 35, 36 are pressed onto and supplied to the tray 50 of the tray transportation mechanism 48.

In this embodiment, the supporting plate 206 for supporting the peeling shaft 210, and the supporting arm 212 for supporting the presser roller 214 are pivotably adjustably attached to the attachment beam 203 through the supporting pins 207, 213. For this reason, when the drums 35, 36 are exchanged with those having different outer diameters, the supporting plate 206 and supporting arm 212 may be pivoted for adjustment such that the peeling shaft 210 and presser roller 214 are brought to proper positions with respect to the outer peripheral surfaces of the drums 35, 36.

(Tray Transportation Mechanism)

Next, the tray transportation mechanism 48 will be described in detail. As illustrated in FIGS. 1 to 3 and 23 to 25, the moving table 49 is supported on the base 31 through a pair of guide rails 223 for movement in the right-to-left direction, so that the moving table 49 is moved by a feeding motor 224 through a feed screw 225. An elevating supporting plate 226 is supported on the moving table 49 to move up and down through a plurality of elevating cylinders 227 and knuckle joints 228, and the tray 50 is disposed on the top surface of the moving table 49 at a first inclined position P1 or at a second inclined position P2, indicated by chain lines in FIG. 1.

Then, the elevating supporting plate 226 is moved up by an elevating cylinder 227 so that the tray 50 carried on the top surface is pressed onto the outer peripheral surfaces of the drums 35, 36 at the lower position. In this event, an inclined movement of the elevating supporting plate 226 is permitted between a portion of the elevating supporting plate 226 corresponding to the drums 35, 36 and a portion of the same not corresponding to them. In this state, by moving the moving table 49 in the left direction, through the under side of the drums 35, 36, the belt materials 46A, 46B peeled from the drums 35, 36 are extended on and transferred to the tray 50 at the first inclined position P1 or second inclined position P2.

A plurality of stopper rollers 229 are rotatably disposed on the elevating supporting plate 226 so as to engage with one side edge and one end edge of the tray 50 arranged at the first inclined position P1 or second inclined position P2. A plurality of clamp cylinders 230 are disposed on the elevating supporting plate 226 so as to correspond to the respective stopper rollers 229, and clamp rollers 231 are attached to these piston rods. Then, a protruding action of each clamp cylinder 230 causes the clamp roller 231 to be pressed to and engaged with the other side and the other edge of the tray 50, so that the tray 50 is clamped to each inclined position P1, P2 on the elevating supporting plate 226.

Figure 23:
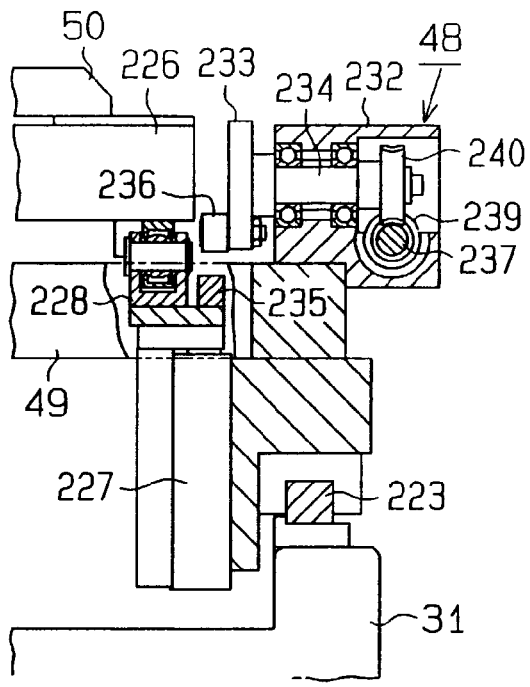
FIG. 23 is an enlarged cross-sectional view illustrating a portion of a tray transportation mechanism.
Figure 24:
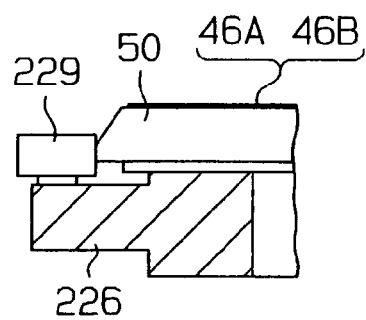
FIG. 24 is a partially enlarged cross-sectional view of a stopper roller portion of the tray transportation mechanism.
Figure 25:
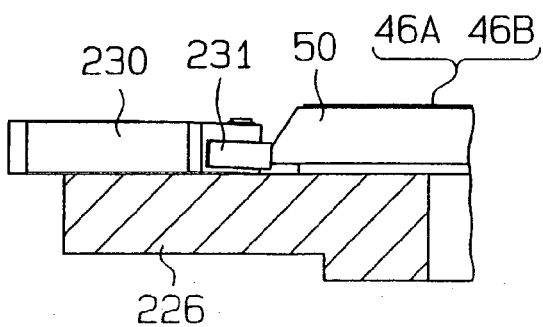
FIG. 25 is a partially enlarged cross-sectional view, similar to FIG. 24, of a clamp cylinder portion.

A plurality of gear cases 232 are disposed at predetermined intervals on front and rear edges on a right-hand top surface of the moving table 49. As illustrated in FIG. 23, an adjusting plate 233 is rotatably supported by each gear case 232 through a rotating shaft 234, and an engaging roller 236 is rotatably supported on the surface of the gear case for engagement with a stopper 235 on a knuckle joint 228. As illustrated in FIG. 1, a pair of adjusting shafts 237 are rotatably supported on the moving table 49 through a plurality of bearing blocks 238 so as to extend along both front and rear edges on the right-hand top surface of the moving table 49. Portions of both adjusting shafts 237 corresponding to the respective gear cases 232 are formed with worms 239, as illustrated in FIG. 23, which are in mesh with a worm wheel 240 on the rotating shaft 234.

A pair of driving shafts 241 are rotatably supported on the moving table 49 through a plurality of bearing blocks 242 so as to extend along the right-side edge of the moving table 49, and their outer ends are operatively coupled to both adjusting shafts 237 through a bevel gear mechanism 243. On a right side surface of the moving table 49, an adjusting motor 244 is disposed, with its motor shaft being operatively coupled to inner ends of both driving shafts 241 through a bevel gear mechanism 245. Then, when the drums 35, 36 are exchanged with those having different outer diameters, each adjusting plate 233 is rotated by the adjusting motor 244 through the driving shaft 241, adjusting shaft 237, worm 239, worm wheel 240 and rotating shaft 234 to change a height position of the engaging roller 236. This results in a change in an upper position of the elevating supporting plate 226 by the elevating cylinder 227, so that the tray 50 is properly brought into contact with the outer peripheral surfaces of the drums 35, 36.

(Operation of Whole Manufacturing Device)

Next, the operation of the device for manufacturing a belt material for a tire, constructed as described above, will be described.

In this manufacturing device, a pair of drums 35, 36, in which the blade grooves 35a, 36a are formed in different directions, and which have different outer diameters, supported by the drum reversing/supporting mechanism 34, are alternately reversed to the upper position and lower position. Then, one of the drums 35, 36 arranged at the upper position is spirally wound with the ribbon 39 around the outer periphery by the ribbon winding mechanism 38 to form the wound body 40. In this event, as to the first drum 35, as illustrated in FIG. 26(*a*), the first drum 35 is rotated in the clockwise direction, while the right-hand winding guide 130A is moved to the front to wind the ribbon 39. On the other hand, as to the second drum 36, as illustrated in FIG. 27(*a*), the second drum 36 is rotated in the counter-clockwise direction, while the left-hand winding guide 130B is moved to the front to wind the ribbon 39.

Also, as to the second drum 36, after the ribbon 39 has been wound up, the edge tape 43 is spirally wound around the outer periphery of the wound body 40 on the second drum 36 along the blade groove 36a by the edge tape winding mechanism 42. In this event, as illustrated in FIG. 27(*b*), the second drum 36 is rotated in the counter-clockwise direction, while the guide roller 162 of the edge tape winding mechanism 42, and the like are moved to the front to wind the edge tape 43.

Further, simultaneously with the winding of the ribbon 39 and the like around the drums 35, 36 at the upper position, the wound bodies 40 on the other drums 35, 36 arranged at the lower position are cut along the blade grooves 36a, 35a by the wound body cutting mechanism 44 to form the belt materials 46B, 46A of predetermined widths. In this event, as to the first drum 35, as illustrated in FIG. 26(*b*), the first drum 35 is rotated in the clockwise direction, while the rotating blade 45 of the wound body cutting mechanism 44 is moved to the front, as it is rotated in the counter-clockwise direction, to perform the cutting operation. On the other hand, as to the second drum 36, as illustrated in FIG. 27(*c*), the second drum 36 is rotated in the clockwise direction, while the rotating blade 45 is moved backward, as it is rotated in the counter-clockwise direction, to perform the cutting operation. Also, with the second drum 36, the cutting is performed along the center line of the edge tape 43 in the width direction to additionally provide the edge tape 43 on both edges of the belt material 46B. At this time, the edge tape 43 is cut by the rotating blade 45 of the cutting mechanism 44, so that a portion thereof is moved to both end faces of the wound body 40 to cover both end faces of the wound body 40.

Then, in the formation of the belt materials 46A, 46B by the wound body cutting mechanism 44, the cut belt materials 46A, 46B are sequentially peeled from the outer peripheries of the drums 35, 36 by the belt material peeling mechanism 47. In this event, the moving table 49 of the tray transportation mechanism 48 is moved in the left direction, and the tray 50 supported at the first inclined position P1 or second inclined position P2 above the tray transportation mechanism 48 is transported from the right, side of the drums 35, 36 to the left side, through the under side of the drums 35, 36. Therefore, as illustrated in FIGS. 1, 26(c) and 27(d), the belt materials 46A, 46B peeled from the drums 35, 36 are supported on the tray 50 at the first inclined position P1 or second inclined position P2 in an extended state.

In the foregoing manner, while a pair of drums 35, 36 are alternately reversed to the upper position and lower position by the drum reversing/supporting mechanism 34, the operation for winding the ribbon 39 around the drums 35, 36 at the upper position, and the operation for cutting the wound bodies 40 on the drums 36, 35 at the lower position are performed in repetition. By this operation, the narrower belt material 46A of a width W1, having the linear cords 39a arranged in one direction as illustrated in FIG. 26(c), and the wider belt material 46B of a width W2, having the linear cords 39a arranged in the opposite direction and the edge tape 43 additionally provided thereto as illustrated in FIG. 27(d), are alternately formed in continuation.

Figure 28:
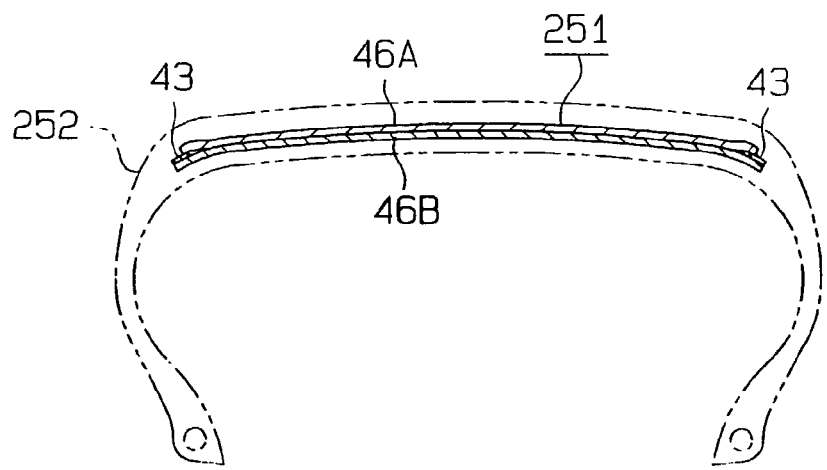
FIG. 28 is a cross-sectional view illustrating a main portion of a belt when it is disposed on the radially outer side of a carcass layer of a tire.
Figure 29:
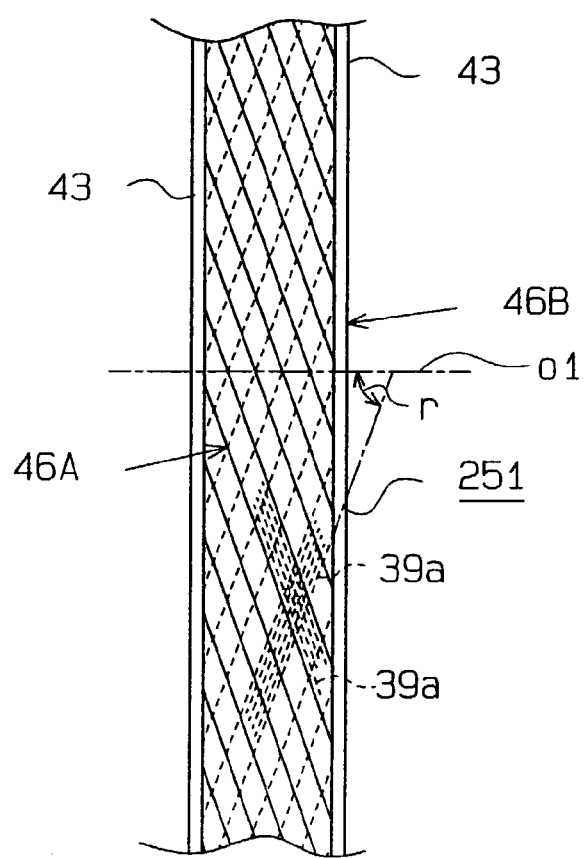
FIG. 29 is a partially enlarged plan view of the belt.
Figure 30:
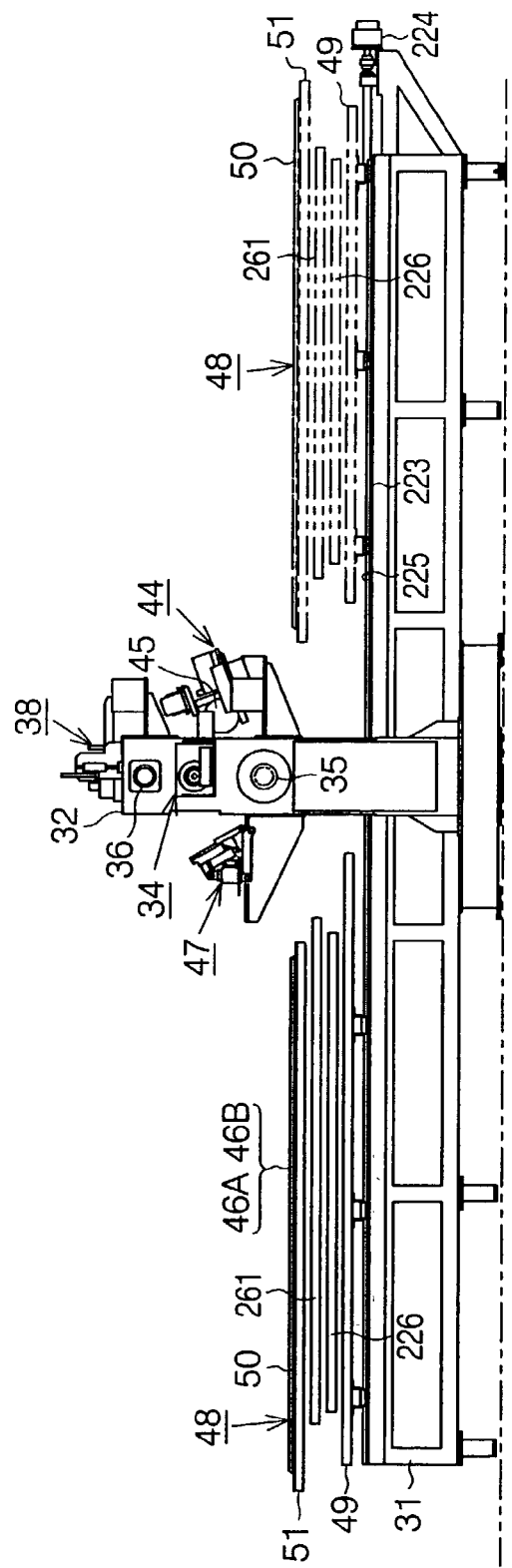
FIG. 30 is a front view illustrating another embodiment of the device for manufacturing a belt material for a tire.

After the wider belt material 46B is wound in a ring shape in a circumferential direction of a tire to form a cylindrical belt material, the narrower belt material 46A is wound around the outer peripheral surface to from a ring-shaped belt 251 as illustrated in FIG. 28. This belt 251 is embedded on the radially outer side of a carcass layer so as to wrap the carcass layer of the tire 252. The directions in which linear cords 39a are arranged in the inner and outer belt materials 46B, 46A are bilaterally symmetric as illustrated in FIG. 29, so that a balance can be maintained for an external dynamic load acting on the tire. An inclination angle Y of the linear cords 39a to the axial line 01 of the tire 251 is set in a range of 64 to 72 degrees.

(Effects of Embodiment)

Effects expected by the foregoing embodiment will be described below.

(1) The ribbon 39 formed of a plurality of cords 39a arranged longitudinally and covered with the rubber 39b is spirally wound around the outer peripheral surfaces of the drums 35, 36 at predetermined pitches T1, T3. The side edges of the wound ribbon 39 are stuck to each other to form the cylindrical wound bodies 40. The wound bodies 40 are spirally cut at predetermined pitches T2, T4, larger than the winding pitches T1, T3 of the ribbon 39 to form the belt materials 46A, 46B which have the predetermined widths W1, W2, and different cord inclination angles β1, β2 in different arrangement directions. Thus, a space for installing the device for manufacturing the belt materials can be reduced.

(2) The outer diameters D1, D2 of the drums 35, 36, and the width E, winding pitches T1, T3 and number N of windings of the ribbon 39, and the spiral cutting pitches T2, T4 of the wound bodies 40 are set based on the length L, widths W1, W2, and cord inclination angles β1, β2 of the belt materials 46A, 46B. Therefore, the intended belt materials 46A, 46B can be readily manufactured without waste.

(3) The length L of the belt material is set to a dimension used for a single tire, so that the need for cutting the belt material into proper dimensions in a later process can be eliminated.

(4) The ribbon winding guides 130A, 130B are moved in an axial direction of the drums at a predetermined feed speed for the drums 35, 36 rotatably supported by the frames 32, 33. Therefore, the ribbon can be smoothly wound around the drums.

(5) The sticking mechanism is configured to follow the ribbon winding operation by the ribbon winding mechanism 38 and stick the side edges of the ribbon with a pressure by the presser roller 131, so that the side edges of the ribbon can be readily stuck to each other.

(6) Since the drums 35, 36 are provided with the clamp arms 60 which form part of the winding start end clamp mechanism that can clamp the winding start end of the ribbon, the ribbon can rapidly be wound up without fail.

(7) Since the frame 32 is provided with the ribbon cutting mechanism 41 for cutting the end of ribbon wound around the drum, the ribbon can be readily cut without fail.

(8) The wound body cutting mechanism 44 is provided to move into contact with and away from the drums 35, 36 and rotate the rotating blade 45 for cutting the wound body, and the drums 35, 36, and moves the rotating blade 45 in the axial direction of the drum at a predetermined feed speed. Therefore, the wound body can be readily cut in a spiral form.

(9) The drums 35, 36 are provided with the spiral blade grooves 35a, 36a on the outer peripheral surfaces thereof at the same pitches as the predetermined pitches T2, T4 at which the wound bodies 40 are spirally cut, and the blade edge of the rotating blade 45 is guided along one edge of the blade grooves 35a, 36a. Therefore, the wound bodies 40 can be readily cut by the rotating blade 45.

(10) The winding start end of the ribbon 39 is cut at the same angle as spiral lead angles α1, α2 of the blade grooves 35a, 36a, as illustrated in FIGS. 9 and 15, the ribbon 39 is started to be wound with this cut edge fed along the blade grooves 35a, 36a of the drums, and the winding is finished with the winding end of the ribbon matching the blade groove. Therefore, the belt materials 46A, 46B, made by cutting the wound body 40, can be formed in the shape of elongated parallelogram.

(11) The winding end of the ribbon 39 is cut such that the angle of the cut edge is identical to the spiral lead angle of the blade groove, and the cut subsequent ribbon is started to be wound with the distal cut edge thereof fed along the blade groove in the next process. Therefore, the belt materials 46A, 46B can be formed in the shape of elongated parallelogram, and the ribbon can be used without waste.

(12) The belt material peeling mechanism 47 is provided for peeling the belt materials 46A, 46B formed by cutting the wound body 40 from the outer peripheries of the drums 35, 36. Therefore, the cut belt materials 46A, 46B can be smoothly peeled from the outer peripheries of the drums 35, 36 in sequence by the belt material peeling mechanism 47.

(13) The tray transportation mechanism 48 is provided for transporting the tray 50 for transferring and supporting the belt materials 46A, 46B peeled from the outer peripheries of the drums 35, 36 in a direction which intersects the axial line of the drums 35, 36. Therefore, since the tray 50 is transported by the tray transportation mechanism 48 in the direction which intersects the axial line of the drums 35, 36, the belt materials 46A, 46B peeled from the drums 35, 36 can be extended and supported so as to be transferred to predetermined positions on the tray 50 without performing works such as a modification.

(14) The tray 50 is formed in a rectangular solid, the tray 50 is disposed to match the spiral lead angles α1, α2 of the spiral blade grooves 35a, 36a formed on the drums, and the tray 50 is moved in a transporting direction in synchronism with the peeling operation for the belt materials peeled from the rotating drums to transfer the belt materials on the tray. Therefore, the volume of the tray 50 can be reduced, and the transportation to the next process can be readily performed.

(15) The frame 32 is provided with the edge tape winding mechanism 42 for winding the edge tape 43 to straddle the blade groove along the blade groove as a scheduled spiral cut line by the wound body cutting mechanism 44 for the outer peripheral surface of the wound body 40 formed on the drum. Therefore, after the edge tape 43 is wound around the outer periphery of the wound body 40 along the blade groove 36a of the drum 36, the wound body 40 is cut along the blade groove 36a of the drum 36, thereby making it possible to readily manufacture the belt material 46B having the edge tape 43 attached to both side edges.

(16) The edge tape winding mechanism 42 is adapted to wind along the blade groove as a scheduled spiral cut line for the wound body 40 for forming the wider belt material 46B out of two processes for manufacturing the wider belt material 46B of the width W2 and the narrower belt material 46A of the width W1. Therefore, two types of belt materials 46A, 46B for use in the belt 251 can be readily manufactured by a single device.

(17) The ribbon winding mechanism 38 is configured to spirally wind the ribbon 39 around the drums 35, 36 in opposite directions, and the wound body cutting mechanism 44 is adapted to spirally cut the wound body 40 in opposite directions. Therefore, the mechanism can be simplified by manufacturing the two types of belt materials 46A, 46B by a set of the ribbon winding mechanism 38 and wound body cutting mechanism 44.

(18) The drums 35, 36 are disposed at two locations, the ribbon is wound around the two drums in opposite directions, and the wound bodies are spirally cut in opposite directions, so that the cord inclination angles $\beta1$, $\beta2$ of the linear cords 39a of the belt materials 46A, 46B are symmetric. Therefore, the two types of belt materials 46A, 46B can be efficiently manufactured.

(19) A pair of drums 35, 36, different in outer diameter, formed with the spiral groove blades 35a, 36a on the outer peripheral surfaces extending in opposite direction to each other are rotatably supported by the drum reversing/supporting mechanism 34, and the drums 35, 36 are alternately reverse to the two upper and lower positions. Then, the ribbon 39 formed of a plurality of linear cords 39a covered with the rubber coating 39b is wound around the outer peripheries of the drums 35, 36 arranged at the upper position to form the wound bodies 40 by the ribbon winding mechanism 38. In addition, the wound bodies 40 on the outer peripheries of the drums 35, 36 arranged at the lower position are cut by the wound body cutting mechanism 44 along the blade grooves 35a, 36a of the drums 35, 36 to form the belt materials 46A, 46B.

Thus, the belt materials 46A, 46B made of steel cords can be readily manufactured by using the ribbon 39 formed of a plurality of linear cords 39a made of steel cords applied with the rubber coating 39b, and winding the ribbon 39 around the outer peripheries of the drums 35, 36. Also, as a pair of drums 35, 36 having different outer diameters and different spiral lead angles $\alpha1$, $\alpha2$ of the blade grooves 35a, 36a are alternately arranged at the two upper and lower positions, the ribbon 39 is wound around the drums 35, 36 arranged at the upper position to form the wound body 40, and the wound body 40 on the drums 36, 35 arranged at the lower position is cut, thereby making it possible to simultaneously and consecutively manufacture two types of belt materials 46A, 46B having different cord inclination angles $\beta1$, $\beta2$ of the linear cords 39a, and different widths W1, W2 by a single device.

(20) The wound body cutting mechanism 44 is provided with the discoidal rotating blade 45 which engages with the blade grooves 35a, 36a of the drums 35, 36. Therefore, even with the belt materials 46A, 46B made of steel cords, the wound body 40 on the drum 35, 36 can be cut to form the belt materials 46A, 46B having predetermined widths with clear cut surfaces in cooperation of the blade grooves 35a, 36a of the drums 35, 36 with the discoidal rotating blade 45.

(Another Embodiment)

Another embodiment of this invention will be described with reference to FIGS. 30 to 34. This embodiment differs from the aforementioned embodiment in the structure of the tray transportation mechanism 48, and the remaining structure is similar to the aforementioned embodiment.

A moving supporting plate 261 is supported on the top surface of the elevating supporting plate 226 through a pair of guide rails 262 for movement in the front-to-back direction. On the moving supporting plate 261, the turntable 51 in the shape of oblong rectangle is pivotally supported by a rotating shaft 263 through a pair of arcuate guide rails 264, and the trays 50 are removably carried on the top surface thereof. The moving supporting plate 261 is provided with a pivoting motor 265, so that the turntable 51 is pivoted by this motor 265 through a gear transmission mechanism 266. By this rotation, the turntable 51 is arranged at a first inclined position P1 inclined by a predetermined angle to one side with respect to a direction in which the moving table 49 moves, as indicated by chain lines in FIG. 31, at a second inclined position P2 inclined by a predetermined angle to the other side with respect to the moving direction; and at a transporting direction position P3 extending in the moving direction, as indicated by solid lines in the same figure.

Then, the elevating supporting plate 226 is moved up by the elevating cylinder 227, so that the tray 50 disposed on the top is pressed onto the outer peripheral surfaces of the drums 35, 36 at the lower position. As the moving table 49 is moved in the left direction, through the under side of the drums 35, 36, in this state, the belt materials 46A, 46B peeled from the drums 35, 36 are extended to the top surface of the tray 50 on the turntable 51 at the first inclined position P1 or second inclined position P2 and transferred.

Figure 32:
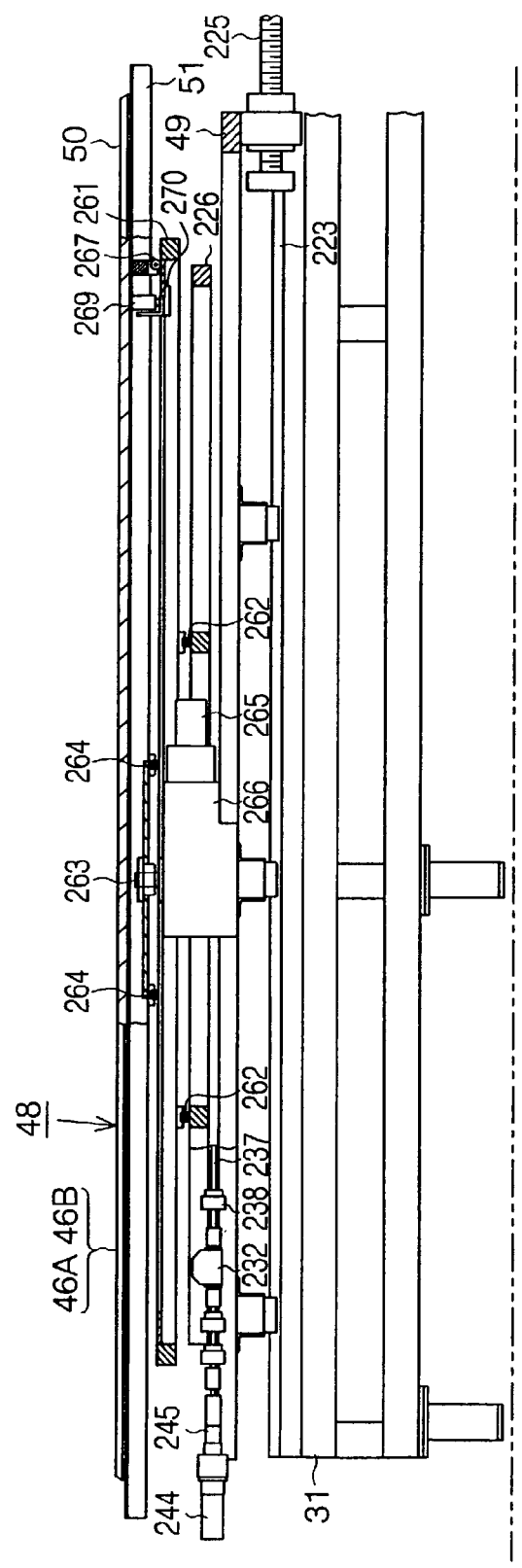
FIG. 32 is a front view of a main portion of the tray transportation mechanism in the other embodiment.
Figure 33:
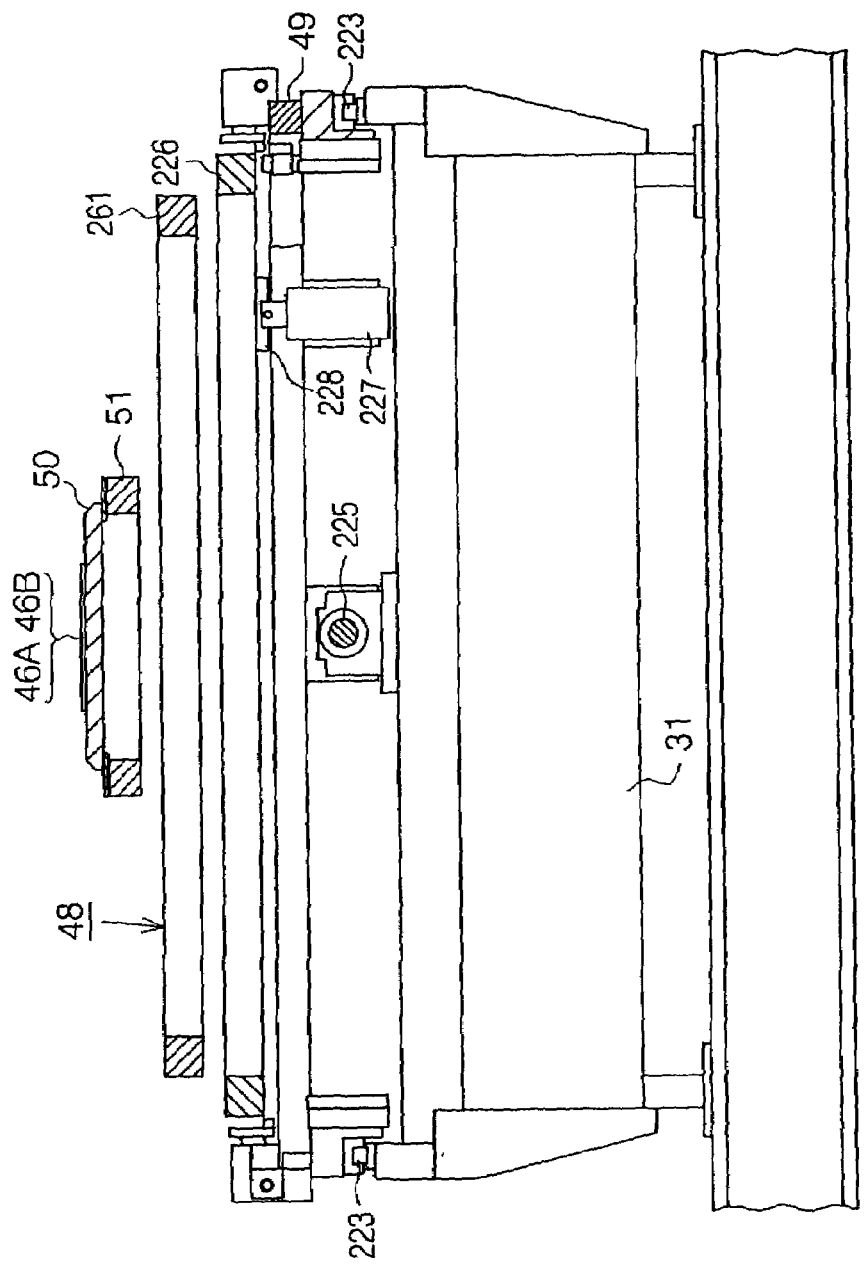
FIG. 33 is a side view of a main portion of the tray transportation mechanism in the other embodiment.
Figure 34:
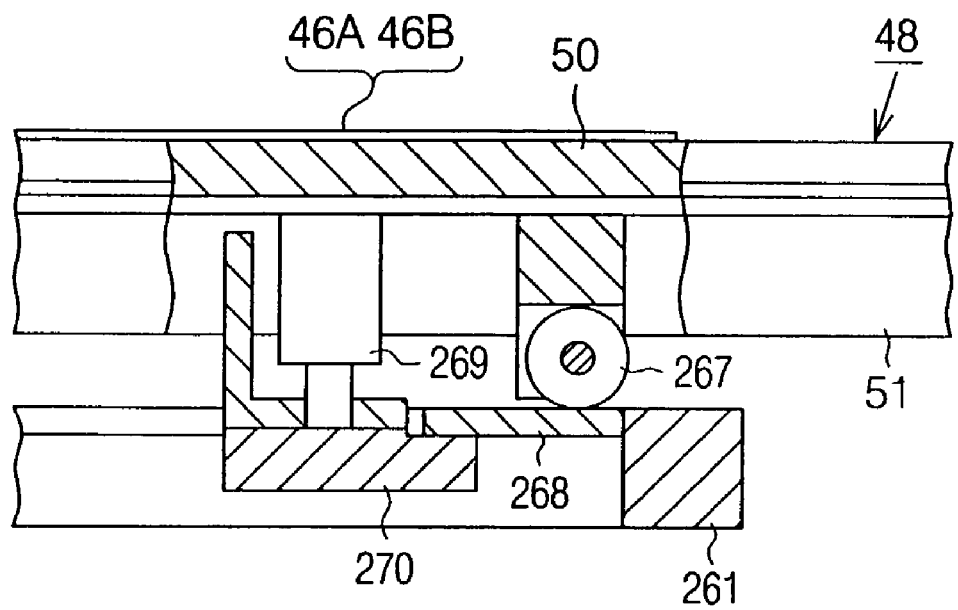
FIG. 34 is an enlarged front sectional view illustrating a portion of the tray transportation mechanism in the other embodiment.

As illustrated in FIGS. 32 and 34, a contact roller 267 is disposed on a bottom surface of one end of the turntable 51 to be in contact with the top surface of a top plate 268 of the moving supporting plate 261. A holding cylinder 269 is disposed on the bottom surface of one end of the turntable 51, and a holding member 270 is attached to its piston rod. Then, with the turntable 51 pivoted to the first inclined position P1, second inclined position P2 or transporting direction position P3, appearing and disappearing actions of the holding cylinder 269 cause the holding member 270 to come into engagement with the top plate 268 of the moving supporting plate 261 to clamp the turntable 51 at the position P1, P2, P3.

Figure 31:
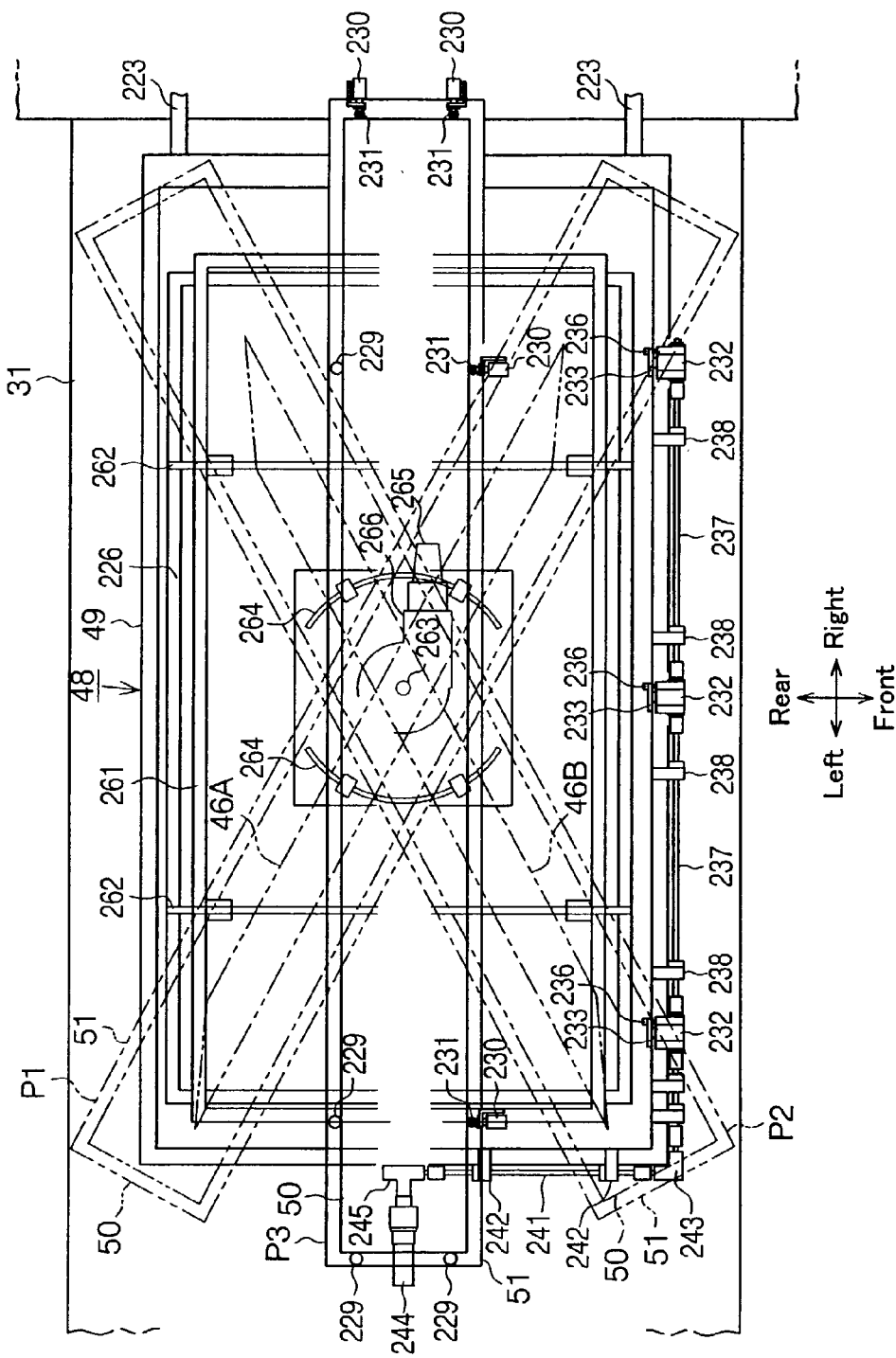
FIG. 31 is an enlarged plan view illustrating a main portion of a tray transportation mechanism in the other embodiment.

As illustrated in FIG. 31, the stopper roller 229, clamp cylinder 230 and clamp roller 231 are attached on the turntable 51.

Next, the operation of this embodiment will be described.

When the belt materials 46A, 46B are cut by the wound body cutting mechanism 44, the cut belt materials 46A, 46B are sequentially peeled from the outer peripheries of the drums 35, 36 by the belt material peeling mechanism 47. In this event, the moving table 49 of the tray transportation mechanism 48 is moved in the left direction, to transport the tray 50 on the turntable 51 pivoted to and arranged at the first inclined position P1 or second inclined position P2 above the moving table 49 from the right side of the drums 35, 36 to the left side through the under side. Therefore, as illustrated in FIG. 31, the belt materials 46A, 46B peeled from the drums 35, 36 are supported on the tray 50 at the first inclined position P1 or second inclined position P2 in an extended state.

Then, when the moving table 49 of the tray transportation mechanism 48 is moved to a left side position on the base 31, the turntable 51 is pivoted from the first inclined position P1 or second inclined position P2 to the transporting direction position P3, as indicated by solid lines in FIG. 31. By this movement, the belt materials 46A, 46B supported on the tray 50 are extended along the transporting direction, and transported to a tire forming machine in the next process, not shown.

Therefore, during the transportation or after the transportation to the next process, the need for modifying the extending direction of the belt materials 46A, 46B is eliminated.

Effects expected by the foregoing embodiment will be described below.

(1) The turntable 51 is pivotably supported on the moving table 49 of the tray transportation mechanism 48, and the tray 50 is carried on the turntable 51. Therefore, with the tray 50 arranged at a position inclined in the direction in which the moving table 49 is moved, the belt materials 46A, 46B peeled from the outer peripheries of the respective drums 35, 36 can be transferred to and supported on predetermined positions on the tray 50 without trouble by a pivotal movement of the turntable 51. Then, after the transfer of the belt materials 46A, 46B, the turntable 51 is pivoted to a position along the direction in which the moving table 49 is moved, so that the belt materials 46A, 46B can be changed in posture from the inclined state to a longitudinally extending state. It is therefore possible to transport the belt materials 46A, 46B without manually changing the postures to a tire forming machine in the next process by an operator.

(2) The turntable 51 is adapted for pivotal movements to the first inclined position P1 inclined by a predetermined angle to one side with respect to the direction in which the moving table 49 is moved, the second inclined position P2 inclined by a predetermined angle to the other side with respect to the moving direction, and the transporting direction position P3 extending along the moving direction. Therefore, with the turntable 51 pivoted to the first inclined position P1, the belt material 46A peeled from one drum 35 can be transferred to and supported on the tray 50 exactly, and with the turntable 51 pivoted to the second inclined position P2, the belt material 46B peeled from the other drum 36 can be transferred to and supported on the tray 50 exactly. Then, after the transfer of these belt materials 46A, 46B, the turntable 51 is pivoted from the first inclined position P1 or second inclined position P2 to the transporting direction position P3, thereby making it possible to readily change the postures of the respective belt materials 46A, 46B from the inclined state to the longitudinally extending state.

(Exemplary Modifications)

This embodiment can also be modified and embodied in the following manner.

Figure 35A:
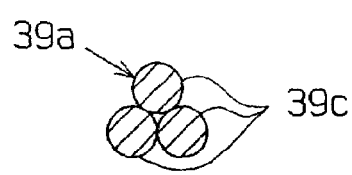
FIGS. 35(a) to 35(c) are cross-sectional views illustrating a process of manufacturing a cord for use in a ribbon.
Figure 35B:
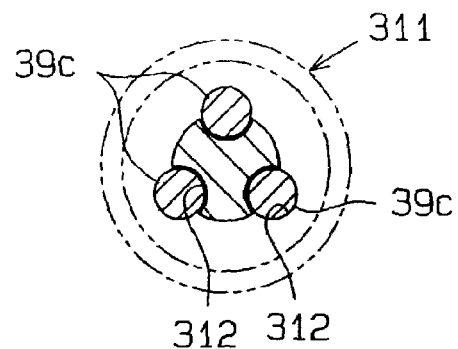
Figure 35C:
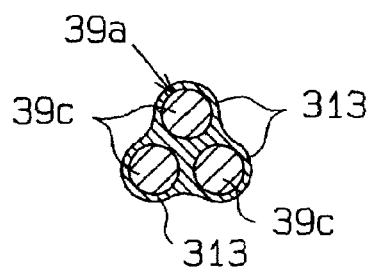
Figure 36:
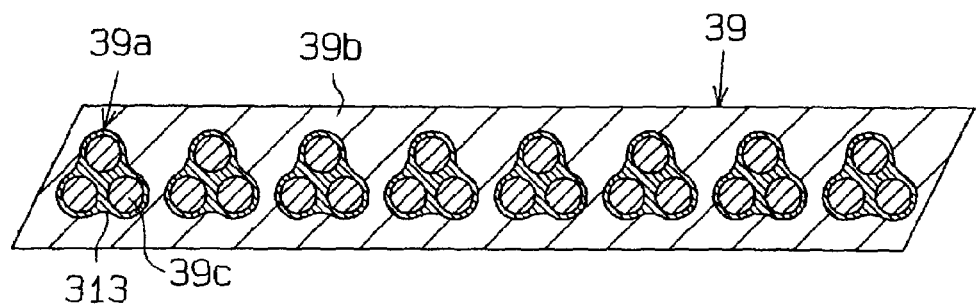
FIG. 36 is a cross-sectional view of the ribbon.

As illustrated in FIG. 35(a), the cords 39a made of a plurality of twisted filaments 39c are passed through separation throughholes 312 of a twist-back member 311 and transferred in the longitudinal direction as illustrated in FIG. 35(b), to twist back the respective filaments 39c and form predetermined spacings between them. In this state, the cords 39a are passed through softened rubber, not shown, to form a rubber layer 313 around the outer peripheries of the respective filaments 39c, as illustrated in FIG. 35(c). After the respective filaments 39c return to the original twisted state by their own twisting stresses, a plurality of similarly fabricated cords 39a are arranged in parallel and passed through a rubber extruder, not shown. Then, as illustrated in FIG. 36, the rubber layer 313 of each cord 39a is covered in flat shape by a rubber coating 39b to form a ribbon 39.

The linear cord 39a coated with the rubber layer 313, provided in the foregoing manner, can have a predetermined stress to an external force or the like, and ensure a sufficient stickness to the rubber coating 39b. Also, since the overall outer periphery of the rubber layer 313 is coated with the rubber coating 39b after the outer periphery of each filament 39c is coated with the rubber layer 313, moisture can be prevented from reaching each filament 39c to improve the anti-corrosive property. Further, since the respective filaments 39c are in contact with one another through the liquid rubber layer 313, good vibration absorption is provided, and the respective filaments can be prevented from directly coming into frictional contact with one another to generate frictional heat.

The manufacturing device of the foregoing embodiment may be configured such that the edge tape winding mechanism 42 is moved alone rather than additionally provided to the ribbon winding mechanism 38 for integral movement therewith.

The manufacturing device of the foregoing embodiment may be configured to omit the edge tape winding mechanism 42 such that after the belt material 46B is formed, the edge tape is stuck to both side edges of the belt material 46B by a different device.

Though not shown, only one drum 35 is mounted to the frame to manufacture the belt material 46A at a first time. Then, the drum 35 may be exchanged with a drum 35' having different outer diameter to manufacture a belt material 46A' having a different width.

A relative movement mechanism may be provided for relatively moving the drums 35, 36 and the ribbon winding guides 130A, 130B at a predetermined feed speed in the axial direction of the drums.

As compared with the foregoing embodiment in which the ribbon winding guides 130A, 130B are moved in the longitudinal direction of the drums while the drums are rotated at predetermined positions, where the drums having large weights are moved, the power can be reduced, and the longitudinal dimension of the drums of the device can be limited.

As the winding start end grabbing mechanism, a mechanism may be used for adsorbing the distal end of the ribbon moved toward the outer periphery of the drum by a sucking hole formed in the drum, or for stopping the distal end of the ribbon with an adhesive or a stopper protrusion.

In place of the ribbon cutting mechanism 41, the operator may cut the winding end of the ribbon 39.

The wound body cutting mechanism 44 may be comprised of a cutter provided for movements into contact with and away from the drums and for cutting the wound bodies, and a relative movement mechanism for rotating the drums, and relatively moving the cutter in the axial direction of the drums at a predetermined feed speed.

The blade grooves of the drums are omitted, and the wound body is spirally cut by a cutting mechanism along a scheduled spiral cutting line. The edge tape 43 may be wound to straddle the scheduled line to manufacture the belt materials with the cutting mechanism.

Three or more drums can be switched among a ribbon winding position, a ribbon sticking position, a wound body cutting position, and a belt material peeling/extracting position by a position switching mechanism.

The ribbon cutting mechanism 41 may be mounted on the ribbon winding mechanism 38.

The ribbon 39 may be formed to have the shape of oblong rectangle in cross-section.

In the manufacturing device of the foregoing embodiments, the specific structures may be modified as appropriate for the drum reversing/supporting mechanism 34, drum clamp mechanism 37, ribbon winding mechanism 38, ribbon cutting mechanism 41, edge tape winding mechanism 42, wound body cutting mechanism 44, belt material peeling mechanism 47, and tray transportation mechanism 48.

What is claimed is:

1. A method of manufacturing a belt material for a tire comprising the steps of:
    providing a drum having a predetermined outer diameter;
    spirally winding a ribbon formed of a plurality of cords arranged longitudinally and covered with a rubber coating around an outer peripheral surface of said drum at a predetermined pitch, and sticking side edges of the wound ribbon to each other to form a cylindrical wound body;
    spirally cutting said wound body at a predetermined pitch larger than the winding pitch of said ribbon to form a belt material having a predetermined width and a cord inclination angle;
    peeling the belt material from said drum;
    transferring the belt material peeled from the drum to a tray; and
    transporting said tray in a transporting direction intersecting an axial line of the drum, wherein said tray is carried on a turntable, which is pivotally supported on a moving table, the moving table being movable in the transporting direction, wherein, with the turntable inclined by a predetermined angle with respect to the transporting direction, the belt material peeled from the drum is transferred to the tray.

2. The method of manufacturing a belt material for a tire according to claim 1, wherein the outer diameter of said drum, a width, winding pitch, number of windings of the ribbon, and the cutting pitch of the wound body are set based on a length, width and cord inclination angle of the intended belt material.

3. The method of manufacturing a belt material for a tire according to claim 2, wherein the length of the belt material is set to a dimension used for a single tire.

4. A device for manufacturing a belt material for a tire, comprising:
    a ribbon winding mechanism for spirally winding a ribbon formed of a plurality of cords arranged longitudinally and coated with a rubber around an outer peripheral surface of a drum at a predetermined pitch;
    a sticking mechanism for sticking side edges of the wound ribbon to each other to form a wound body;
    a wound body cutting mechanism for spirally cutting said wound body at a predetermined pitch larger than the winding pitch of said ribbon to form a belt material having a predetermined width and a cord inclination angle;
    a belt material peeling mechanism for peeling the belt material from said drum;
    a tray for receiving the belt material peeled from the drum; and
    a tray transportation mechanism for transporting said tray in a direction intersecting an axial line of the drum, wherein the tray transportation mechanism includes a moving table, which is movable in the direction intersecting the axial line of the drum, and a turntable, which is pivotally supported on the moving table, said tray being carried on the turntable.

5. The device for manufacturing a belt material for a tire according to claim 4, wherein said ribbon winding mechanism is comprised of a ribbon winding guide corresponding to the drum rotatably supported by a frame, and a relative movement mechanism for relatively moving said drum and said ribbon winding guide in an axial direction of the drum at a predetermined feed speed.

6. The device for manufacturing a belt material for a tire according to claim 4, wherein said sticking mechanism is configured to stick the side edges of the ribbon with a pressure by a press-roller which follows a ribbon winding operation by said ribbon winding mechanism.

7. The device for manufacturing a belt material for a tire according to claim 4, wherein said drum is provided with a winding start end grabbing mechanism capable of grabbing a winding start end of the ribbon.

8. The device for manufacturing a belt material for a tire according to claim 4, further comprising a ribbon cutting mechanism for cutting a finish end of the ribbon wound around the drum.

9. The device for manufacturing a belt material for a tire according to claim 4, wherein said wound body cutting mechanism comprises a cutter for cutting the wound body, and a movement mechanism for moving the cutter, said cutter being disposed corresponding to said drum for movements into contact with and away from the drum, and the movement mechanism rotating said drum and moving said cutter in a longitudinal direction of the drum at a predetermined feed speed.

10. The device for manufacturing a belt material for a tire according to claim 9, wherein said drum is provided with a spiral blade groove in said outer peripheral surface at the same pitch as said cutting pitch, wherein a blade edge of said cutter is guided along one edge of said blade groove to cut the wound body.

11. The device for manufacturing a belt material for a tire according to claim 4, further comprising a transfer mechanism for pressing the belt material peeled from the drum onto a top surface of said tray with a predetermined pressure.

12. The device for manufacturing a belt material for a tire according to claim 11, wherein said drum is provided with a spiral blade groove in said outer peripheral surface at the same pitch as said cutting pitch, wherein said tray is formed in the shape of rectangle, said tray is disposed so as to match the spiral lead angle of the spiral blade groove, and said tray is moved in the transporting direction in synchronism with an operation for peeling off the belt material from the rotating drum to transfer the belt material onto the tray.

13. The device for manufacturing a belt material for a tire according to claim 4, further comprising an edge tape winding mechanism for winding an edge tape on the outer peripheral surface of the wound body formed on said drum, along a scheduled spiral cutting line by the wound body cutting mechanism so as to straddle the scheduled line.

14. The device for manufacturing a belt material for a tire according to claim 13, wherein out of two processes for manufacturing a wider belt material of a width and a narrower belt material of a width, said edge tape winding mechanism is configured to wind the edge tape along a scheduled spiral cutting line for a wound body for forming the wider belt material.

15. The device for manufacturing a belt material for a tire according to claim 4, wherein said ribbon winding mechanism is configured to be capable of spirally winding the ribbon around the drum in opposite directions, and said wound body cutting mechanism is configured to be capable of spirally cutting the wound body in opposite directions.

16. The device for manufacturing a belt material for a tire according to claim 4, wherein said drum is one of a plurality of drums that are disposed at a plurality of locations, and each of said drums is configured to be switchable among a ribbon winding position, a ribbon sticking position, a wound body cutting position, and a belt material peeling/extracting position by a position switching mechanism.

17. The device for manufacturing a belt material for a tire according to claim 16, wherein said drums are two drums, and ribbons are wound around the two drums in directions opposite to each other and wound bodies on the two drums are each spirally cut in directions opposite to each other such that cord inclination angles of the linear cords of the belt materials obtained from the two drums are substantially symmetric.

18. The device for manufacturing a belt material for a tire according to claim 17, wherein said two drums have different outer diameters and are formed with spiral blade grooves extending in directions opposite to each other in said outer peripheral surfaces, said position switching mechanism is a drum reversing/supporting mechanism for rotatably supporting said two drums and for alternately reversing said drums to two positions, wherein a ribbon is wound around the outer periphery of the drum arranged at one position by the drum reversing/supporting mechanism to form a wound body, and said wound body on the outer periphery of the drum arranged at the other position by said drum reversing/supporting mechanism is cut along the blade groove of the drum to form a belt material.

19. The device for manufacturing a belt material for a tire according to claim 4, wherein said drum is provided with a spiral blade groove in said outer peripheral surface at the same pitch as said cutting pitch, wherein said wound body cutting mechanism is provided with a cutter for engagement with the blade groove of the drum to press a blade edge of the cutter to an edge of the blade groove.

20. The device for manufacturing a belt material for a tire according to claim 4, wherein said turntable is configured to be pivoted to a first inclined position inclined by a predetermined angle to one side with respect to a direction in which the moving table is moved, a second inclined position inclined by a predetermined angle to the other side with respect to the moving direction, and a transporting direction position extending along the moving direction.

21. The device for manufacturing a belt material for a tire according to claim 4, comprising clamp means on the turntable for removably clamping the tray.

22. A device for manufacturing a belt material for a tire comprising:

a ribbon winding mechanism for spirally winding a ribbon formed of a plurality of cords arranged longitudinally and covered with a rubber coating around an outer peripheral surface of a drum having a predetermined outer diameter at a predetermined pitch;

a sticking mechanism for sticking side edges of the wound ribbon to each other to form a cylindrical wound body;

a wound body cutting mechanism for spirally cutting said wound body at a predetermined pitch larger than the winding pitch of said ribbon to form a belt material having a predetermined width and a cord inclination angle;

a peeling shaft for peeling the belt material from said drum, said peeling shaft being capable of approaching and separating away from said drum;

a tray for receiving the belt material peeled from the drum;

a rotatable press-roller for pressing the belt material peeled from the drum onto the tray; and a tray transportation mechanism for transporting said tray in a direction intersecting an axial line of the drum while the belt material is pressed onto the tray by the press-roller.

23. A method of manufacturing a belt material for a tire comprising the steps of:

alternately reversing first and second drums to first and second locations, the first and second drums having different outer diameters;

spirally winding a ribbon, which is formed of a plurality of cords arranged longitudinally and covered with a rubber coating around an outer peripheral surface of the first drum arranged at the first location at a predetermined pitch, and sticking side edges of the wound ribbon to each other to form a first cylindrical wound body around said first drum;

spirally cutting said first wound body on the first drum arranged at the second location at a predetermined first pitch larger than the winding pitch of said ribbon to form a first belt material having a predetermined first width and a cord inclination angle;

spirally winding the ribbon around the second drum arranged at the first location to form a second wound body when said first wound body on the first drum arranged at the second location is being spirally cut; and spirally cutting said second wound body on the second drum arranged at the second location to form a second belt material when the ribbon is being spirally wound around the first drum arranged at the first location, the second wound body being spirally cut at a predetermined second pitch different from the predetermined first pitch so that the second belt material has a predetermined second width different from the predetermined first width, wherein the ribbons are wound around the first and second drums in directions opposite to each other and the first and second wound bodies on the drums are each spirally cut in directions opposite to each other such that cord inclination angles of the linear cords of the first and second belt materials obtained from the drums are substantially symmetric.

* * * * *